United States Patent
Arimoto

(10) Patent No.: US 9,421,787 B2
(45) Date of Patent: Aug. 23, 2016

(54) ABNORMALITY SENSING METHOD FOR PRESSURE SENSOR, AND LIQUID DISCHARGE DEVICE

(71) Applicant: FUJIFILM Corporation, Tokyo (JP)

(72) Inventor: Makoto Arimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/851,960

(22) Filed: Sep. 11, 2015

(65) Prior Publication Data

US 2015/0375520 A1    Dec. 31, 2015

Related U.S. Application Data

(63) Continuation of application No. PCT/JP2014/053859, filed on Feb. 19, 2014.

(30) Foreign Application Priority Data

Mar. 15, 2013   (JP) ................................. 2013-053660

(51) Int. Cl.
   *B41J 2/175*   (2006.01)
   *G01L 19/12*   (2006.01)
   (Continued)

(52) U.S. Cl.
   CPC ............ *B41J 2/17596* (2013.01); *B41J 2/175* (2013.01); *B41J 2/17509* (2013.01); *G01L 19/12* (2013.01); *G01L 27/002* (2013.01); *B41J 2/14153* (2013.01); *B41J 2002/14354* (2013.01)

(58) Field of Classification Search
   CPC ........ B41J 2/175; B41J 2/17596; B41J 2/18; B41J 2/17509; B41J 2/125; B41J 2/14153; B41J 2002/14354; G01L 27/002; G01L 19/12

USPC .............................................. 347/6
   See application file for complete search history.

(56) References Cited

U.S. PATENT DOCUMENTS

| 2006/0184310 A1* | 8/2006 | Hasegawa ............. F02D 41/222 701/114 |
| 2012/0007902 A1 | 1/2012 | Hiratsuka et al. |
| 2012/0024395 A1* | 2/2012 | Furukawa ................ B41J 2/175 137/14 |

FOREIGN PATENT DOCUMENTS

| JP | 2000-229422 A | 8/2000 |
| JP | 2003-343362 A | 12/2003 |

(Continued)

OTHER PUBLICATIONS

Notification of Transmittal of Translation of the International Preliminary Report on Patentability (Chapter I) and Translation of Written Opinion of the International Searching Authority; PCT/JP2014/053859; issued on Sep. 24, 2015.

(Continued)

*Primary Examiner* — Manish S Shah
*Assistant Examiner* — Yaovi M Ameh
(74) *Attorney, Agent, or Firm* — Studebaker & Brackett PC

(57) ABSTRACT

The liquid discharge device includes a supply path which guides a liquid accumulated in a liquid accumulating unit to a liquid ejection head, a supply pump which feeds a liquid to the liquid ejection head from the liquid accumulating unit through the supply path, a damper which has a liquid chamber and an air chamber sectioned via a flexible membrane, and a pressure sensor, a pressure value is acquired from the pressure sensor in a state where the air chamber is open to atmosphere, and whether or not there is abnormality in the pressure sensor is determined based on comparison between a hydraulic head pressure between the damper and the pressure sensor, and the pressure value.

11 Claims, 15 Drawing Sheets

(51) Int. Cl.
*G01L 27/00* (2006.01)
*B41J 2/14* (2006.01)

(56) References Cited

FOREIGN PATENT DOCUMENTS

| JP | 2005-119186 A | | 5/2005 | |
|----|---------------|---|--------|---|
| JP | 2009-155749 A | | 7/2009 | |
| JP | 2009-233979 | * | 10/2009 | ............ B41J 2/175 |
| JP | 2009-233979 A | | 10/2009 | |
| JP | 2011-098490 A | | 5/2011 | |
| JP | 2012-016904 A | | 1/2012 | |
| JP | 2012-183806 A | | 9/2012 | |

OTHER PUBLICATIONS

International Search Report; PCT/JP2014/053859; Apr. 8, 2014.
Written Opinion of the International Searching Authority; PCT/JP2014/053859; Apr. 8, 2014.
The extended European search report issued by the European Patent Office on Jan. 25, 2016, which corresponds to European Patent Application No. 14764254.0-1701 and is related to U.S. Appl. No. 14/851,960.

* cited by examiner

ABNORMALITY SENSING METHOD FOR PRESSURE SENSOR, AND LIQUID DISCHARGE DEVICE

CROSS-REFERENCE TO RELATED APPLICATIONS

This application is a Continuation of PCT International Application No. PCT/JP2014/053859 filed on Feb. 19, 2014, which claims priority under 35 U.S.C. §119(a) to Japanese Patent Application No. 2013-053660 filed on Mar. 15, 2013. Each of the above applications is hereby expressly incorporated by reference, in their entirety, into the present application.

BACKGROUND OF THE INVENTION

1. Field of the Invention

The present invention relates to a technique for sensing whether or not there is abnormality in a pressure sensor used for pressure control of a liquid discharge device typified by an ink jet device.

2. Description of the Related Art

In ink jet equipment, in order to normally eject ink from a nozzle of a print head, it is essential to perform appropriate back pressure control. Particularly, to perform appropriate back pressure control, it is indispensable that a pressure sensor of the control system output a correct pressure value.

However, there is a case where a failure occurs at a pressure sensor provided on an ink channel due to chemical wear or the like caused by ink, and the pressure sensor outputs a value different from an accurate pressure value. In such a case, normal back pressure control cannot be guaranteed, which causes abnormality in an ejection environment and eventually results in degradation in quality (image abnormality) of a printed image.

As a simple method for sensing abnormality of the pressure sensor, there is a method in which a sensor for calibration (for example, a pressure sensor corresponding to an additional one set) is separately provided. However, because such a method increases cost of the equipment, a configuration is desirable in which abnormality can be sensed using the pressure sensor alone.

Japanese Patent Application Laid-Open No. 2012-183806 (PTL 1), Japanese Patent Application Laid-Open No. 2000-229422 (PTL 2) and Japanese Patent Application Laid-Open No. 2012-016904 (PTL 3) refer to abnormality sensing within an ink channel or an ink circulation control method. PTL 1 discloses sensing abnormality within the channel by determining whether or not an ink circulation amount acquired from speed of a pump is a normal value. PTL 2 discloses sensing abnormality of an ink channel by recognizing relationship between an appropriate value of an ink pressure and a number of rotation of a motor which drives a pump in advance and determining whether or not the number of rotation of the motor falls within a fixed allowable range. PTL 3 discloses providing differential pressure adjusting means for detecting pump speed and securing an appropriate circulation amount.

SUMMARY OF THE INVENTION

However, the techniques disclosed in PTL 1 to PTL 3 are all directed to sense abnormality within the channel and improve control accuracy, and none of PTL 1 to PTL 3 refers to a case where a pressure sensor itself fails. With the techniques disclosed in PTL 1 to PTL 3, it is difficult to appropriately determine whether or not the pressure sensor itself fails. This problem is not only a problem for an ink jet printer, but a problem common to liquid discharge devices of various applications.

The present invention has been made in view of such circumstances, and an object of the present invention is to provide an abnormality sensing method of a pressure sensor which can sense a failure in a case where the pressure sensor provided within a channel of a liquid discharge device fails, and the liquid discharge device to which the abnormality sensing method is applied.

In order to solve the above-described problem, the following aspects of the invention are provided.

(First Aspect):

An abnormality sensing method of a pressure sensor according to a first aspect is a method for sensing abnormality of the pressure sensor of a liquid discharge device including a liquid ejection head, a liquid accumulating unit in which a liquid to be supplied to the liquid ejection head is accumulated, a supply path which guides the liquid accumulated in the liquid accumulating unit to the liquid ejection head, a supply pump which feeds the liquid from the liquid accumulating unit to the liquid ejection head through the supply path, a damper which is provided on the supply path and which has a liquid chamber and an air chamber sectioned via a flexible membrane, and the pressure sensor, the abnormality sensing method including an atmosphere opening step of opening the air chamber to atmosphere, a pressure value acquiring step of acquiring a pressure value from the pressure sensor in a state where the air chamber is open to atmosphere, and an abnormality determining step of determining whether or not there is abnormality in the pressure sensor based on comparison between a hydraulic head pressure between the damper and the pressure sensor and the pressure value.

According to the first aspect, when the air chamber is open to atmosphere, a pressure corresponding to the hydraulic head pressure between the damper and the pressure sensor is applied at a position of the pressure sensor. Because the hydraulic head pressure between the damper and the pressure sensor can be assumed in advance from a structure of the supply path of a liquid in the liquid discharge device, it is possible to determine whether the sensor output from the pressure sensor is a normal value (whether the pressure sensor normally functions) or an abnormal value (whether abnormality or a failure occurs at the pressure sensor) by comparing the pressure value obtained from the pressure sensor with the hydraulic head pressure. By this means, it is possible to sense whether or not there is abnormality with the pressure sensor alone without separately providing a sensor for calibration, or the like.

The pressure sensor can be provided at any arbitrary position if the hydraulic head pressure between the damper and the pressure sensor can be measured. The pressure sensor may be provided at a downstream side of the damper on the supply path which flows a liquid from the liquid accumulating unit to the liquid ejection head, or the pressure sensor may be provided at an upstream side of the damper.

(Second Aspect):

The abnormality sensing method of the pressure sensor according to the first aspect can include a membrane position adjusting step of adjusting a position of the flexible membrane to a position in a non-elastic deformation region where elastic force of the flexible membrane can be ignored, prior to the step (the pressure value acquiring step) of acquiring the pressure value in a state where the air chamber is open to atmosphere.

When the flexible membrane is located at a position where elastic force of the flexible membrane cannot be ignored, the pressure value detected at the pressure sensor is affected by the elastic force of the membrane. It is therefore preferable that the pressure value be acquired after the membrane position is adjusted to the non-elastic deformation region (that is, a dead zone) where influence of the elastic force of the membrane can be ignored.

(Third Aspect):

In the abnormality sensing method of the pressure sensor according to the second aspect, the step (the membrane position adjusting step) of adjusting the position of the flexible membrane can include a pressurizing step of bringing the flexible membrane into contact with an inner wall of the damper by driving the supply pump in a pressurization direction to increase a pressure inside the damper, and a depressurizing step of, after the flexible membrane is brought into contact with the inner wall of the damper, driving the supply pump in a depressurization direction to extract a designated amount of a liquid from the liquid chamber.

A volume of a container constituting the damper can be recognized in advance, and relationship between a liquid amount (volume) of the liquid chamber and the position of the flexible membrane can be also recognized in advance. Further, relationship between a drive amount of the supply pump and the liquid amount can be also recognized. Therefore, by driving the supply pump in the depressurization direction from a state where the flexible membrane is brought into contact with the inner wall of the damper and discharging the designated amount of the liquid from inside of the damper, it is possible to adjust the flexible membrane to a desired membrane position in the non-elastic deformation region.

(Fourth Aspect):

In the abnormality sensing method of the pressure sensor according to any one of the first aspect to the third aspect, a threshold is determined based on an allowable error when the pressure value is acquired, and, if a difference between the pressure value and the hydraulic head pressure determined from relative height of the pressure sensor with respect to the damper exceeds the threshold, it is possible to determine that the pressure sensor is abnormal.

In an actual liquid discharge device, because there are various types of error factors as to measurement of the pressure, it is preferable that a threshold for determination be determined taking into account possible errors.

It should be noted that in order to evaluate a difference between the pressure value obtained from the pressure sensor and the hydraulic head pressure, in addition to an aspect where one of both values is subtracted from the other of both values, it is also possible to calculate a ratio between both values.

(Fifth Aspect):

In the abnormality sensing method of the pressure sensor according to the fourth aspect, where the pressure value is P_exp, a unit of P_exp is pascals, relative height of the pressure sensor with respect to the position of the damper is H, a unit of H is meters, density of the liquid is $\rho$, a unit of $\rho$ is $kg/m^3$, gravitational acceleration is g, and a unit of g is $m/s^2$, it is possible to determine whether or not there is abnormality by comparing an absolute value |P_exp−ΣgH| of a difference between a value of the hydraulic head pressure determined by $\rho gH$ and the pressure value P_exp with the threshold.

(Sixth Aspect):

In the abnormality sensing method of the pressure sensor according to any one of the first aspect to the fifth aspect, where a hydraulic head error due to a size of the pressure sensor is ΔP_sys_sensor, a hydraulic head error due to a size of the damper is ΔP_sys_damper, and a measurement error of the pressure sensor is ΔP_measured, a total error ΔP_total can be obtained from ΔP_total={(ΔP_sys_sensor)$^2$+(ΔP_sys_damper)$^2$+(ΔP_measured)$^2$}$^{1/2}$, a unit of ΔP_total can be pascals, and the threshold for determination can be determined based on the value of the total error ΔP_total.

(Seventh Aspect):

In the abnormality sensing method of the pressure sensor according to any one of the first aspect to the six aspect, the liquid discharge device can include a collection path through which a liquid is collected from the liquid ejection head, a collection pump which is provided on the collection path, a collection side damper which is provided on the collection path and which has a liquid chamber and an air chamber sectioned via a flexible membrane, and a collection side pressure sensor which is provided on the collection path, and the abnormality sensing method can include an atmosphere opening step of opening the air chamber of the collection side damper to atmosphere, a pressure value acquiring step of acquiring a pressure value from the collection side pressure sensor in a state where the air chamber of the collection side damper is open to atmosphere, and an abnormality determining step of determining whether or not there is abnormality in the collection side pressure sensor based on comparison between a hydraulic head pressure between the collection side damper and the collection side pressure sensor, and the pressure value acquired from the collection side pressure sensor.

In a case where a circulation type liquid discharge device having a supply path and a collection path is configured such that the damper having the air chamber and the pressure sensor are provided at each of the supply side and the collection side, the pressure sensors at the supply side and the collection side can respectively and independently sense abnormality of the pressure sensors.

Regarding a method for determining whether or not there is abnormality in the collection side pressure sensor, it is possible to employ the same configuration as the configurations described in the first aspect to the sixth aspect.

(Eighth Aspect):

A liquid discharge device according to the eighth aspect includes a liquid ejection head, a liquid accumulating unit in which a liquid to be supplied to the liquid ejection head is accumulated, a supply path which guides the liquid accumulated in the liquid accumulating unit to the liquid ejection head, a supply pump which feeds the liquid from the liquid accumulating unit to the liquid ejection head through the supply path, a damper which is provided on the supply path and which has a liquid chamber and an air chamber sectioned via a flexible membrane, a pressure sensor, and an abnormality sensing processing unit which acquires a pressure value from the pressure sensor in a state where the air chamber is open to atmosphere, and determines whether or not there is abnormality in the pressure sensor based on comparison between a hydraulic head pressure between the damper and the pressure sensor, and the pressure value.

(Ninth Aspect):

The liquid discharge device according to the eighth aspect can include a control unit which controls the supply pump based on information from the pressure sensor, and the control unit can function as the abnormality sensing processing unit.

(Tenth Aspect):

In the liquid discharge device according to the ninth aspect, the control unit can perform control of adjusting a position of the flexible membrane to a position in a non-elastic deformation region where elastic force of the flexible membrane can be ignored before the pressure value is acquired in a state where the air chamber is open to atmosphere.

(Eleventh Aspect):

The liquid discharge device according to any one of the eighth aspect to the tenth aspect can include a collection path through which a liquid from the liquid ejection head is collected, a collection pump which is provided on the collection path, a collection side damper which is provided on the collection path and which has a liquid chamber and an air chamber sectioned via the flexible membrane, and a collection side pressure sensor which is provided on the collection path, and the abnormality sensing processing unit can acquire a pressure value from the collection side pressure sensor in a state where the air chamber of the collection side damper is open to atmosphere and determine whether or not there is abnormality in the collection side pressure sensor based on comparison between a hydraulic head pressure between the collection side damper and the collection side pressure sensor and the pressure value acquired from the collection side pressure sensor.

According to the present invention, it is possible to sense abnormality of a pressure sensor without separately providing a sensor for calibration, or the like.

DETAILED DESCRIPTION OF EXEMPLARY EMBODIMENTS

Embodiments of the present invention will be described in detail below according to the accompanying drawings.

First Embodiment

Non-Circulation Type Ink Jet Device

Figure 1:
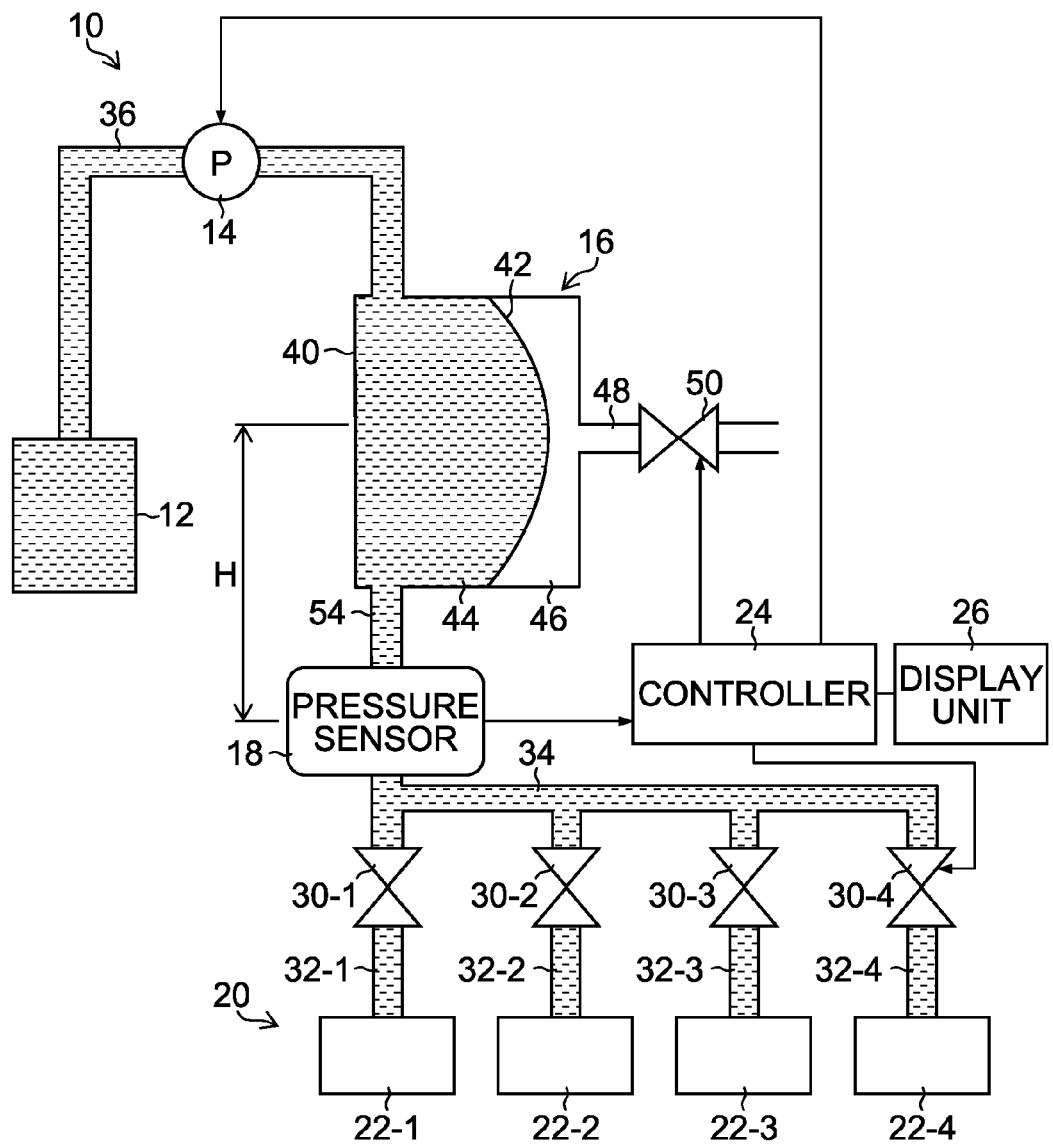
FIG. 1 is a schematic diagram of an ink supply system in an ink jet device according to a first embodiment.

FIG. 1 schematically illustrates a configuration of an ink supply system in an ink jet device according to the first embodiment. Here, an example of a system in which an ink is supplied to a print head using a non-circulation method is illustrated.

An ink jet device 10 (corresponding to a "liquid discharge device") includes an ink tank 12 (corresponding to a "liquid accumulating unit"), a supply pump 14, a damper 16 for a pump for reducing pressure fluctuation caused by pulsation of the supply pump 14, a pressure sensor 18, ink jet type liquid ejection head modules (hereinafter, referred to as "head modules") 22-$i$ (where i=1, 2, . . . n) which are included in a print head 20, a controller 24 which functions as a control device, and a display unit (display) 26. While FIG. 1 illustrates four (n=4) head modules, the number n of the head modules used in the print head 20 is not particularly limited, and it can be designed so that an arbitrary number of one or more of head modules are provided (where n is an integer of 1 or greater). The head modules 22-$i$ (where i=1, 2, . . . n) correspond to a "liquid ejection head" and the controller 24 corresponds to an "abnormality sensing processing unit" and a "control unit."

The head modules 22-$i$ are respectively connected to a common manifold 34 via supply pipes 32-$i$ on which valves 30-$i$ intervene. It should be noted that, in the following description, regarding explanation common to a plurality of head modules 22-$i$ (where i=1, 2, . . . n), indication of an additional character of "i" will be omitted, and the head modules 22-$i$, the valves 30-$i$ and the supply pipes 32-$i$ will be respectively described as a "head module 22", a "valve 30" and a "supply pipe 32."

The valve 30 is formed with an on-off valve (for example, electromagnetic valve) which can be controlled to be open and closed by a control signal from the controller 24.

The manifold 34 is a common channel portion which distributes ink to each head module 22, and ink is supplied to the head module 22 from the manifold 34 through the supply pipe 32. When the head module 22 is replaced, or when control of pressure purging is performed for each head module 22, opening and closing of the valve 30 of the supply pipe 32 which leads to the corresponding head module 22 is individually controlled. It should be noted that, in a type of a device in which the head module 22 is not replaced, or pressure purging is not performed for each module, the valve 30 can be omitted.

In the ink tank 12, ink to be supplied to each head module 22 is accumulated. The ink tank 12 functions as an ink supply source. The ink tank 12 may be a main tank or a sub tank in which ink is supplied from the main tank and accumulated. The ink tank 12 may take a form where the whole container can be replaced like an ink cartridge or an ink package, or a form where the container is refilled with ink.

The supply pump 14 is provided in the middle of a first channel 36 which connects the ink tank 12 and the damper 16. It is preferable that the supply pump 14 be configured to be able to switch between drive in a pressurization (liquid sending) direction and drive in a depressurization (suction) direction. In the present example, a tube pump is used as the supply pump 14. A case where the supply pump 14 is driven in a direction ink is sent from the ink tank 12 to the damper 16 is referred to as the "pressurization direction," and drive in the pressurization direction is regarded as a positive rotation direction of the supply pump 14. Adversely, a case where the supply pump 14 is driven in a direction ink is returned from the damper 16 toward the ink tank 12 is referred to as the "depressurization direction," and drive in the depressurization direction is regarded as a negative rotation direction of the supply pump 14.

The damper 16 includes a flexible membrane 42 which is disposed within a container 40 having a sealed structure, and has a structure in which inside of the container 40 is sectioned into a liquid chamber 44 and an air chamber 46 by the flexible membrane 42. In the air chamber 46, an atmosphere communicating path 48, which can be opened and closed by a valve 50, is provided. It should be noted that there is a case where the damper 16 is referred to as a back pressure tank because the damper 16 applies a required negative pressure to each head module 22.

The valve 50 is formed with an on-off valve (for example, an electromagnetic valve) which can be controlled to be opened and closed by a control signal from the controller 24. It should be noted that, hereinafter, the valve 50 will be referred to as an "atmosphere opening valve."

The pressure sensor 18 is provided at a downstream side of the damper 16. FIG. 1 illustrates an example where the pressure sensor 18 is provided in the middle of a second channel 54 which connects the liquid chamber 44 of the damper 16 and a manifold 34. However, a position where the pressure sensor 18 is provided is not limited to this example. For example, the pressure sensor 18 can be also provided at the manifold 34.

In the present embodiment, whether or not there is abnormality in the pressure sensor 18 is determined by utilizing a hydraulic head pressure caused by a difference H in height of height at which the pressure sensor 18 is provided with respect to height at which the damper 16 is provided. Therefore, the pressure sensor 18 is provided on the ink channel so as to be able to directly measure the hydraulic head pressure. Detailed description regarding determination of abnormality of the pressure sensor 18 will be described later.

A signal of the pressure sensor 18 is transmitted to the controller 24. The controller 24 functions as an abnormality sensing processing unit (abnormality determining unit) which determines whether or not there is abnormality in the pressure sensor 18 based on the signal (detection signal) obtained from the pressure sensor 18. Further, the controller 24 functions as a pump control unit which controls the supply pump 14. The controller 24 drives the supply pump 14 so as to achieve a target pressure which is set as a control target. The controller 24 controls rotation speed of the supply pump 14 to achieve the target pressure based on the pressure value designated by the signal obtained from the pressure sensor 18.

Further, the controller 24 functions as a valve control unit which controls the valve 30 of the supply pipe 32 which leads to each head module 22, and the atmosphere opening valve 50.

The display unit 26 is connected to the controller 24, and, when abnormality of the pressure sensor 18 is sensed, an alarm message is presented on the display unit 26. The display unit 26 functions as notification means for notifying a user (operator) whether or not there is abnormality. The controller 24 functions as a display control unit which generates a display control signal to be output to the display unit 26. It should be noted that, as means for notifying of abnormality, sound output means may be employed instead of or in combination with a configuration where an alarm is displayed on the display unit 26.

In the ink jet device 10 in FIG. 1, an ink channel system which guides ink from the ink tank 12 to each head module 22 corresponds to a "supply path." The ink channel system including the first channel 36, the damper 16, the second channel 54, the manifold 34 and the supply pipe 32 in FIG. 1 corresponds to the supply path.

Method for Sensing Abnormality of Pressure Sensor

A method for sensing whether or not there is abnormality in the pressure sensor 18 in the present embodiment will be described next.

Figure 2:
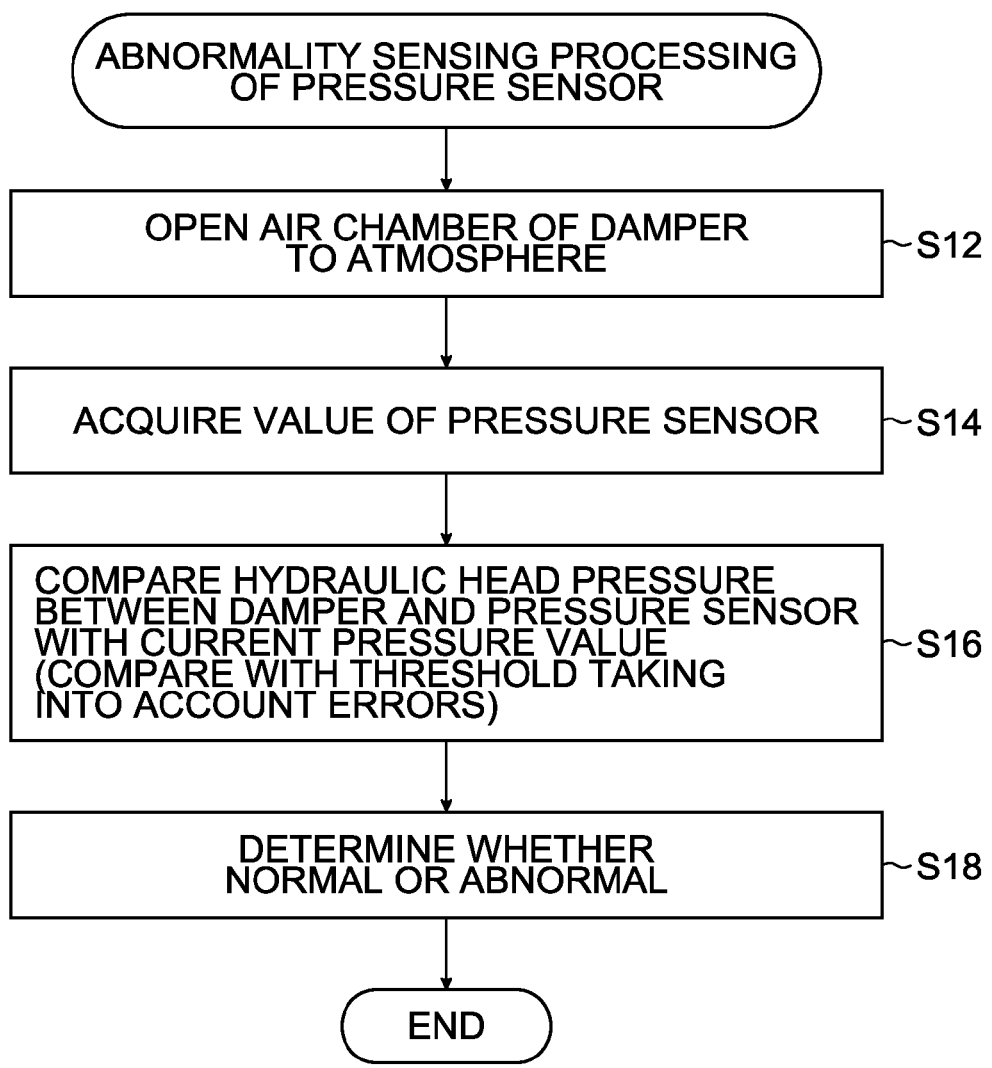
FIG. 2 is a flowchart illustrating procedure of processing of sensing whether or not there is abnormality in a pressure sensor.

FIG. 2 is a flowchart illustrating procedure of processing of sensing whether or not there is abnormality in the pressure sensor 18.

(Procedure 1):

First, the atmosphere opening valve 50 provided on the atmosphere communicating path 48 in the air chamber 46 of the damper 16 is opened, so that the air chamber 46 is open to atmosphere (step S12; corresponding to an atmosphere opening step).

(Procedure 2):

In a state where the air chamber 46 is open to atmosphere, a pressure value indicated by the pressure sensor 18 is read out (step S14; corresponding to a pressure value acquiring step).

At this time, because the air chamber 46 is open to atmosphere, the pressure value of inside of the damper 16 is 0 [Pa]. It should be noted that the pressure value is expressed with a gauge pressure based on atmosphere. In contrast to this, where relative height (difference in height) of the pressure sensor 18 with respect to the damper 16 is H, and if the pressure sensor 18 normally functions, the pressure value indicated by the sensor output is originally expected to be $\rho gH$ [Pa] which corresponds to the hydraulic head pressure. Here, $\rho$ is density of ink (a unit is [kg/m$^3$]) and g is gravitational acceleration (a unit is [m/s$^2$]), and a unit of height H of the pressure sensor 18 with respect to the damper 16 is [m]. H indicates a positive value when the pressure sensor 18 is located below the damper 16, while H indicates a negative value when the pressure sensor 18 is located above the damper 16.

(Procedure 3):

A current pressure value P_exp being outputted from the pressure sensor 18 is acquired, and whether or not the current pressure value P_exp is a normal value is determined (step S18) by comparing it with $\rho gH$ (step S16). The steps S16 and S18 correspond to an abnormality determining step.

The following method is employed as one example of a specific method of the determination processing.

That is, whether or not there is abnormality is distinguished by setting an absolute value |P_exp−$\rho gH$| of a difference between the current pressure value P_exp and the value of $\rho gH$ as $\Delta$P_diff and comparing $\Delta$P_diff=|P_exp−$\rho gH$| with a threshold for determination. The threshold is determined in terms of an allowable error amount while a system error according to sizes of the damper 16 and the pressure sensor 18 and an error of a sensor output value of the pressure sensor 18 are taken into account.

The threshold is determined, for example, while the following values are taken into account.

[1] Where a radius of the pressure sensor 18 is r_sensor, the pressure sensor 18 has a system error of $\Delta P\_sys\_sensor = \rho \times g \times r\_sensor$ [Pa]. For example, where the radius of the pressure sensor 18 is 1 cm, the pressure sensor 18 has a system error of approximately 100 Pa.

[2] The system error according to the size of the damper 16 is the same as the system error of the pressure sensor, and the damper 16 has a system error according to the size of the damper 16. The system error of the damper 16 is set as $\Delta P\_sys\_damper$.

[3] A measurement value of the pressure sensor 18 includes a system error of $\Delta P\_measured$.

[4] A total error $\Delta P\_total$ of the above-described respective error components becomes $\Delta P\_total = \{(\Delta P\_sys\_sensor)^2 + (\Delta P\_sys\_damper)^2 + (\Delta P\_measured)^2\}^{1/2}$ [Pa]. Whether or not there is abnormality can be determined using this value $\Delta P\_total$ as the threshold.

That is, it is determined that the value of the pressure sensor 18 is a normal value where $\Delta P\_diff$ is equal to or less than the threshold as a result of comparing $\Delta P\_diff$ with the predetermined threshold ($\Delta P\_total$). On the other hand, it is determined that the value of the pressure sensor 18 is abnormal where $\Delta P\_diff$ exceeds and is greater than the threshold ($\Delta P\_total$).

Method for Avoiding Influence of Tension of Flexible Membrane 42

The flexible membrane 42 (hereinafter, there is a case where it is simply referred to as a "membrane") of the damper 16 is formed with an elastic member. When the pressure value is read out from the pressure sensor 18 in a state where the air chamber 46 is open to atmosphere, when elastic force of the flexible membrane 42 is small enough to be ignored, there is no problem. However, if elastic force of the membrane is applied to the liquid chamber 44 as external force in a state where the membrane is tensioned, there is a case where a measurement value of an original hydraulic head pressure cannot be correctly read out.

To avoid such circumstances, it is preferable that the position of the membrane be adjusted to the position in a region where elastic force of the membrane can be ignored (non-elastic deformation region) in advance.

Figure 3:
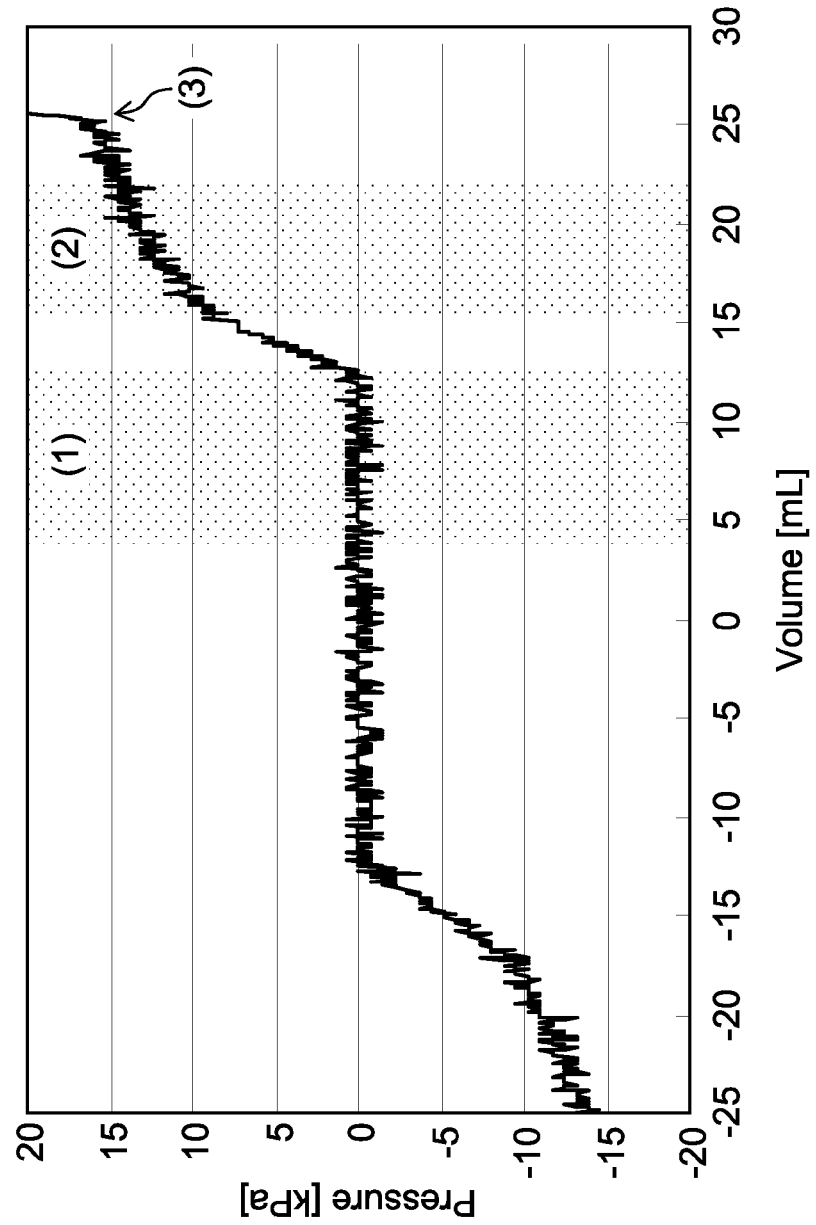
FIG. 3 is a graph illustrating pressure response of a membrane provided inside a damper.

FIG. 3 is a graph illustrating relationship (static pressure response) between an amount of a liquid to be supplied to and discharged from the liquid chamber 44 of the damper 16 and a pressure of the membrane disposed inside the damper 16. FIG. 3 illustrates the liquid amount (volume) on a horizontal axis and the pressure on a vertical axis. It should be noted that because a value on the horizontal axis in FIG. 3 indicates a relative value indicating increase or decrease of a liquid from a liquid amount corresponding to a membrane position of a reference, the position of "0" is arbitrary. The membrane position corresponding to "0" on the horizontal axis in FIG. 3 indicates, for example, a state where a liquid is supplied to half of the total volume of the container 40 of the damper 16. The static response illustrated in FIG. 3 is measured when a liquid is supplied to the liquid chamber 44 or a liquid is discharged from the liquid chamber 44 in a state where the atmosphere opening valve 50 of the air chamber 46 illustrated in FIG. 1 is opened.

In the configuration illustrated in FIG. 1, it is possible to change an amount of a liquid (liquid volume) to be supplied to the liquid chamber 44 by adjusting a drive amount of the supply pump 14. The flexible membrane 42 which separates the liquid chamber 44 and the air chamber 46 deforms according to the liquid amount inside the liquid chamber 44.

Figure 4:
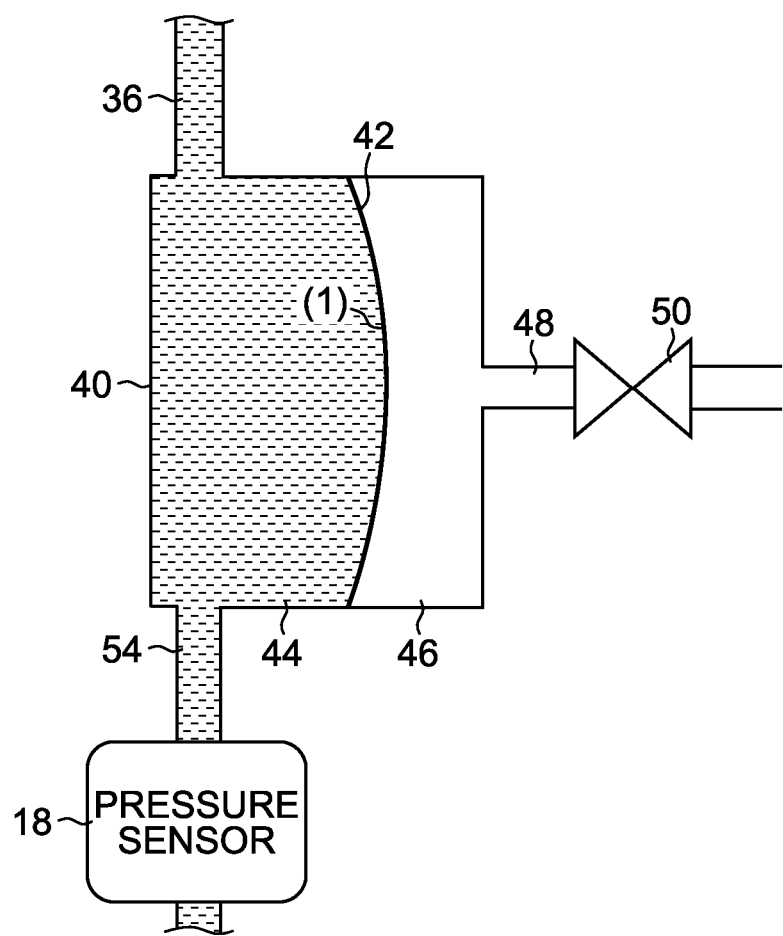
FIG. 4 is a schematic diagram illustrating an aspect where a flexible membrane is set at a membrane position in a dead zone (non-elastic deformation region)

As illustrated in (1) in FIG. 3, a region where a pressure hardly changes with respect to change of the liquid amount inside the liquid chamber 44 (that is, displacement of the membrane), is a region where elastic force of the membrane can be ignored (for example, a region where the membrane is hardly tensioned and is slack, corresponding to the "non-elastic deformation region," also referred to as a "dead zone"). FIG. 4 is a schematic diagram illustrating an aspect where the flexible membrane 42 is set at the membrane position in the dead zone (non-elastic deformation region). It is possible to acquire a value not affected by external force of the membrane by reading out the measurement value of the hydraulic head pressure in a state where the position of the membrane is set in the dead zone. Further, in a case where the damper 16 is made to operate using elastic force of the air chamber 46 in a state where the position of the membrane is set in the dead zone, because the damper 16 can be used at a portion where elastic force is small, it is possible to efficiently suppress pulsation of the supply pump 14.

In the present specification, an operation region where elastic force of the flexible membrane 42 can be ignored is referred to as a "dead zone." The dead zone is a region where elastic force of the membrane with respect to displacement of the flexible membrane 42 is small enough to be ignored. From the other viewpoint, the dead zone is defined as a region where the elastic force of the membrane is not proportional (linear) with respect to the displacement of the membrane.

In the example of FIG. 3, in a case where the value on the horizontal axis falls within a range of between approximately "−12 mL" and "12 mL," the elastic force of the membrane hardly contributes to change of the volume of the liquid, and thus, this range corresponds to the "dead zone."

Meanwhile, as illustrated in (2) in FIG. 3, a region where the pressure substantially changes in proportion to change of the liquid amount inside the liquid chamber 44 (that is, displacement of the membrane), is a region where elastic force of the membrane is dominantly effective (a region where the membrane is tensioned and stretched, corresponding to the "elastic deformation region," also referred to as a "region outside the dead zone").

Figure 5:
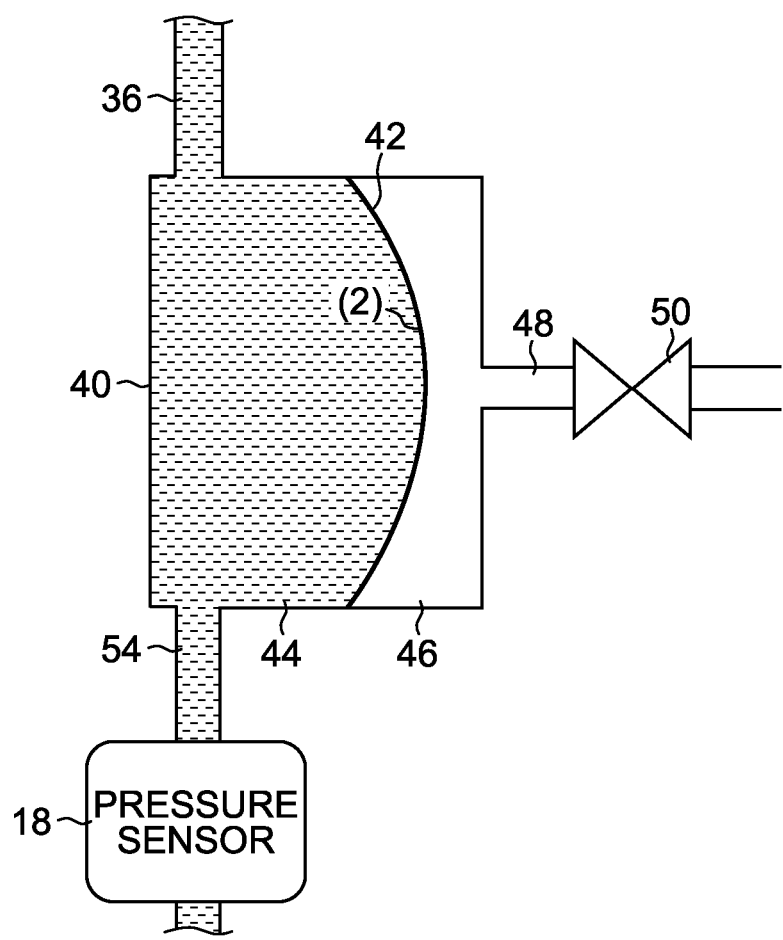
FIG. 5 is a schematic diagram illustrating an aspect where the flexible membrane is set at a membrane position in a region outside the dead zone (elastic deformation region)

FIG. 5 is a schematic diagram illustrating an aspect where the flexible membrane 42 is set at a membrane position in a region outside the dead zone (elastic deformation region). When operation is performed in a state where the position of the membrane is set in the elastic deformation region, as illustrated in FIG. 5, the flexible membrane 42 elastically deforms, so that elastic force of the membrane is great.

When the membrane is put into such a state, even if the air chamber 46 is open to atmosphere, the pressure of the liquid chamber 44 in the damper 16 does not become 0 [Pa], and there is a concern that correct P_exp cannot be acquired.

That is, when the flexible membrane 42 is positioned in the dead zone, if the air chamber 46 is open to atmosphere, the inside of the liquid chamber 44 of the damper 16 becomes 0 Pa. On the other hand, when the flexible membrane 42 is positioned in the region outside the dead zone, due to elastic force of the membrane being applied, the pressure detected at the pressure sensor 18 does not become a value of only the hydraulic head pressure, and there is a possibility that normal abnormality sensing (failure sensing) may be hindered.

In order to solve the above-described concern, in the present embodiment, when tension of the flexible membrane 42 of the damper 16 cannot be ignored, processing of adjusting the position of the flexible membrane 42 of the damper 16 to the position in the dead zone (initialization of the membrane position) is performed, before a pressure value is acquired from the pressure sensor 18 in a state where the air chamber is open to atmosphere, so as to operation is implemented in the dead zone of the membrane. Process of initialization of the membrane position is as follows.

Figure 6:
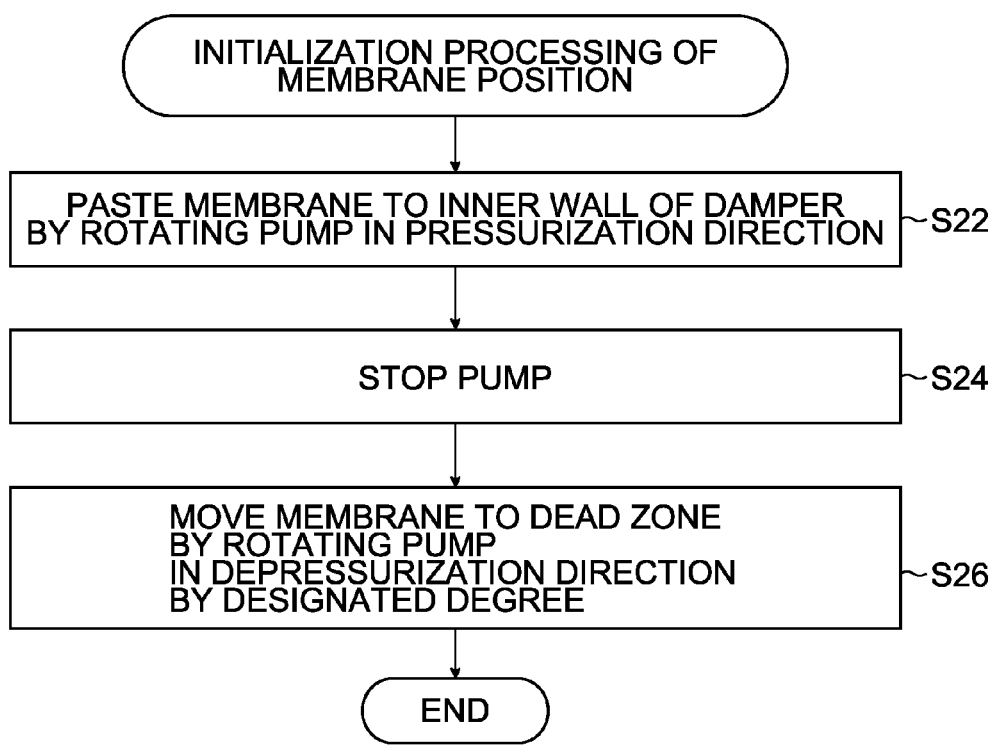
FIG. 6 is a flowchart illustrating procedure of initialization processing of the membrane position.

FIG. 6 is a flowchart illustrating procedures of the initialization processing of the membrane position. The procedures correspond to a "membrane position adjusting step."

Figure 7:
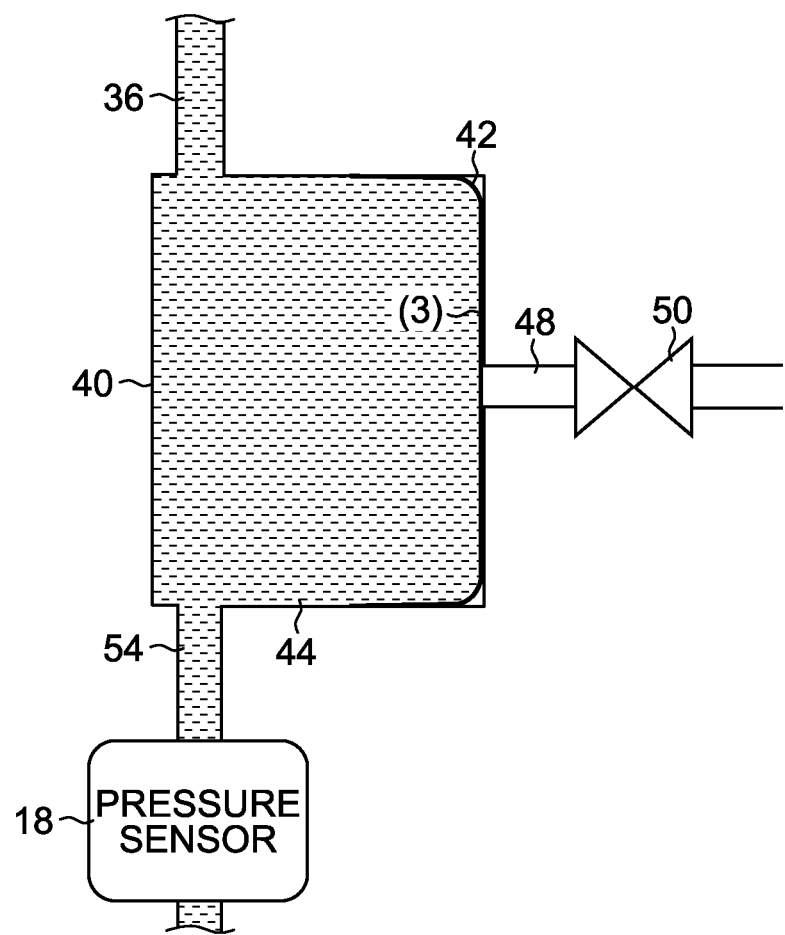
FIG. 7 is a schematic diagram illustrating an aspect where the flexible membrane is pasted on an inner wall of the damper.

First, in a state where the atmosphere opening valve 50 of the damper 16 is opened, the supply pump 14 is rotated in a pressurization direction to increase a pressure inside the damper 16, so that the flexible membrane 42 is brought into contact with an inner wall of the damper 16 (step S22; corresponding to a pressurizing step). FIG. 7 is a schematic diagram illustrating an aspect where the flexible membrane 42 is pasted on the inner wall of the damper 16. When the flexible membrane 42 is pasted on the inner wall of the damper 16, as illustrated in (3) in FIG. 3, the pressure precipitously increases. In the case of the graph in FIG. 3, it can be recognized that the flexible membrane 42 is pasted on the inner wall of the damper 16 at a point where the liquid amount is around 25 mL.

Subsequently, after pasting of the flexible membrane 42 on the inner wall of the damper 16 is sensed, the supply pump 14 is stopped (step S24 in FIG. 6).

Then, the supply pump 14 is rotated in a depressurization direction by a designated degree, so that the flexible membrane 42 is moved to the position in the dead zone (step S26 in FIG. 6; corresponding to a depressurizing step). At this time, the membrane position of the flexible membrane 42 is determined by an amount of a liquid discharged from the container 40 of the damper 16. At the membrane position set at this time, elastic force of the flexible membrane 42 is not generated.

In this manner, after the membrane position of the flexible membrane 42 is adjusted, abnormality sensing processing of the pressure sensor described using FIG. 2 is performed. By making the membrane operate in the dead zone, it is possible to correctly acquire a pressure value output from the pressure sensor 18, so that it is possible to increase accuracy of abnormality sensing.

Example of Specific Control Procedure

Figure 8:
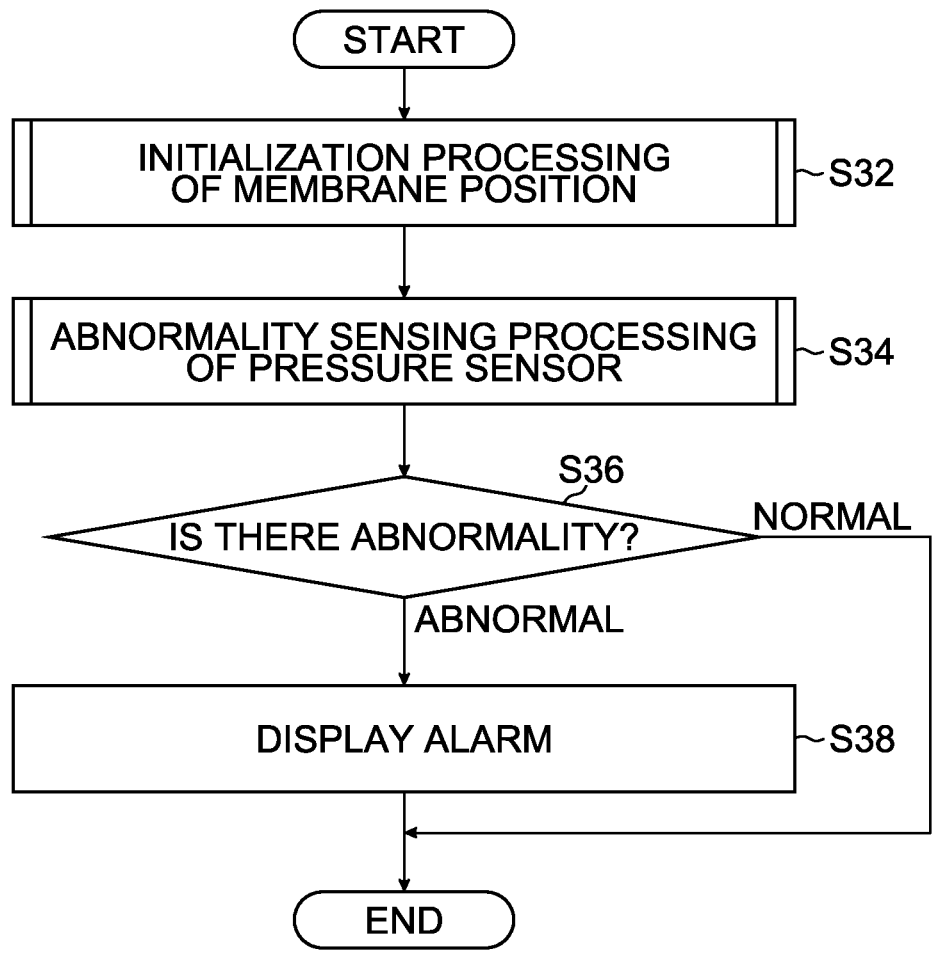
FIG. 8 is a flowchart illustrating one example of operation control of the ink jet device according to the present embodiment.

FIG. 8 is a flowchart illustrating one example of operation control of an ink jet device 10 according to the present embodiment. As illustrated in FIG. 8, initialization processing of the membrane position is performed (step S32; corresponding to a membrane position adjusting step). The initialization processing is as described using FIG. 6 and FIG. 7.

Subsequently, abnormality sensing processing of the pressure sensor is performed (step S34 in FIG. 8; corresponding to an atmosphere opening step, a pressure value acquiring step and an abnormality determining step). Procedure of the abnormality sensing processing is as described using FIG. 2.

As a result of the abnormality sensing processing, when it is determined that the pressure sensor 18 is abnormal (when it is determined as "abnormal" in step S36 in FIG. 8), an alarm is displayed on the display unit 26 (see FIG. 1), so that a user is notified of abnormality (failure) (step S38 in FIG. 8).

On the other hand, as a result of the abnormality sensing processing, when it is determined that the pressure sensor 18 is normal (when it is determined as "normal" in step S36 in FIG. 8), step S38 is omitted, and the processing is finished.

The processing flow of abnormality sensing as illustrated in FIG. 8 can be performed at an appropriate timing, for example, before the ink jet device is activated, or upon maintenance.

According to the present embodiment, it is possible to perform pressure control after confirming that the pressure sensor 18 is normally running, so that it is possible to realize accurate back pressure control.

Second Embodiment

Circulation Type Ink Jet Device

Figure 9:
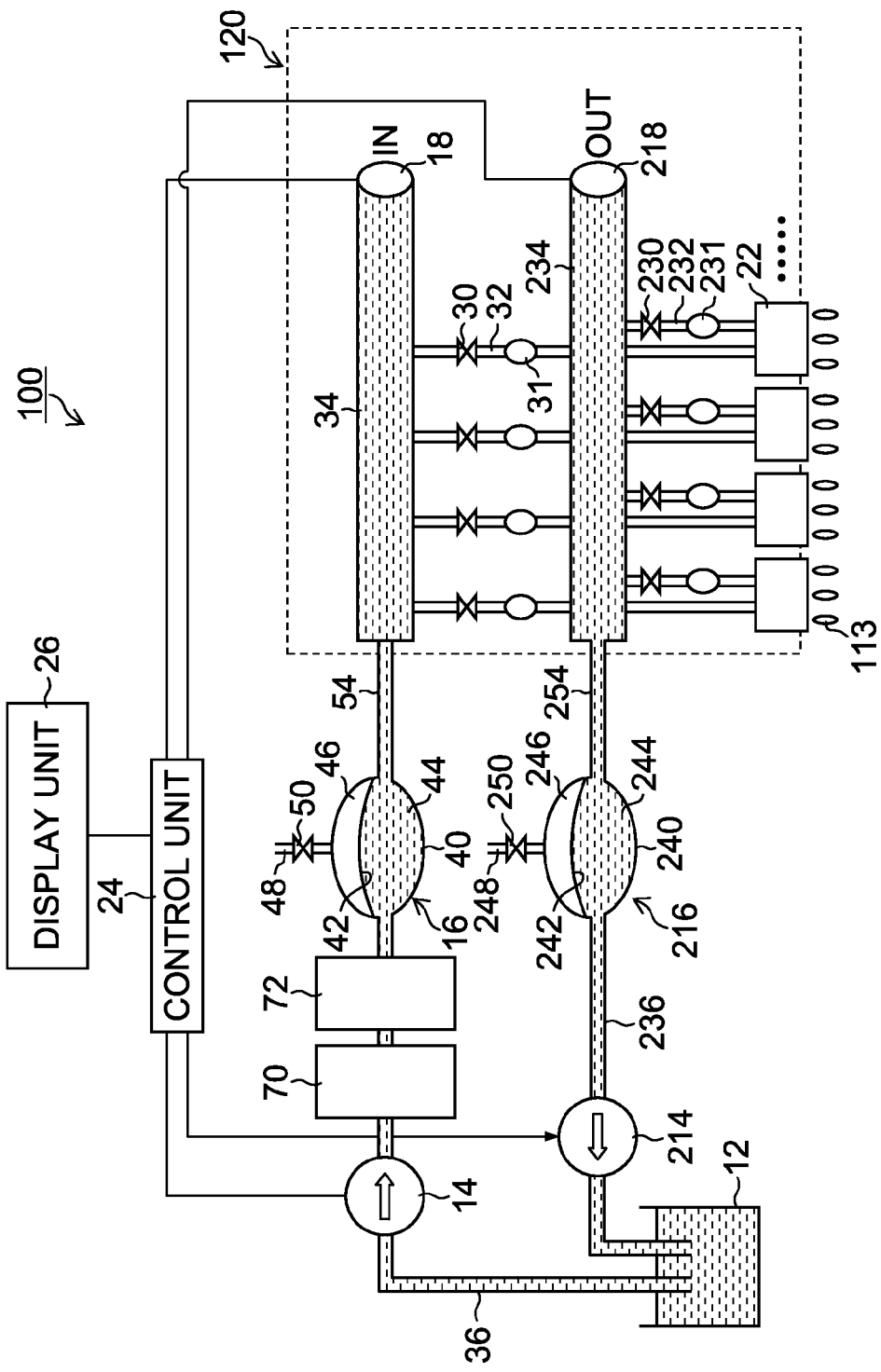
FIG. 9 is a schematic diagram of an ink supply system in an ink jet device according to a second embodiment.

FIG. 9 is a diagram schematically illustrating a configuration of an ink supply system in an ink jet device according to a second embodiment. Here, an example of a system where ink is supplied to a print head using a circulation method is illustrated. In an ink jet device 100 illustrated in FIG. 9, the same reference numerals are assigned to components which are the same as or which are similar to those described using FIG. 1, and explanation thereof will be omitted.

The ink jet device 100 illustrated in FIG. 9 includes a head bar 120 which is configured as a long line head in which a plurality of head modules 22 are aligned.

The ink jet device 100 includes a channel system (collection path) for collecting ink from the head module 22. As illustrated in FIG. 9, the ink jet device 100 includes a collection pump 214, a collection side damper 216, and a collection side manifold 234 as components constituting the channel system at a collection side.

The head modules 22 are respectively connected to a common collection side manifold 234 through collection pipes 232 on which the valves 230 and the dampers 231 for heads intervene. The valve 230 is formed with an on-off valve (for example, an electromagnetic valve) which can be controlled to be opened and closed by a control signal from the controller 24.

It should be noted that a damper 31 for a head is also provided on the supply pipe 32 which connects a manifold 34 at a supply side (hereinafter, referred to as a "supply side manifold 34") and each head module 22. The dampers 31 and 231 for heads play a role for attenuating pulsation (pulsating flow) caused by droplet ejection operation of the head modules 22.

The collection pump 214 is provided in the middle of a third channel 236 which connects the ink tank 12 and the collection side damper 216 (damper for a pump). A pump which is configured to be able to switch drive between the pressurization direction and the depressurization direction is used as the collection pump 214 as with the supply pump 14.

A structure of the collection side damper 216 is the same as a structure of the damper 16 at the supply side (hereinafter, referred to as a "supply side damper 16"), and the collection side damper 216 is configured such that a flexible membrane 242 is disposed inside a container 240 having a sealed structure, and the inside of the container 240 is sectioned into a liquid chamber 244 and an air chamber 246 by the flexible membrane 242. An atmosphere communicating path 248, which can be opened and closed by a valve 250, is provided in the air chamber 246.

The valve 250 is formed with an on-off valve (for example, an electromagnetic valve) which can be controlled to be opened and closed by a control signal from the controller 24. It should be noted that reference numeral 250 will be hereinafter referred to as an "atmosphere opening valve."

In the illustrated ink jet device 100, a pressure sensor 18 at the supply side (hereinafter, expressed as a "supply side pressure sensor 18") is provided at an end portion of a manifold 34 at the supply side (hereinafter, expressed as a "supply side manifold 34").

In a similar manner, a collection side pressure sensor 218 is provided at an end portion of a collection side manifold 234.

While, in FIG. 9, in order to simplify the illustration, the supply side damper 16 has the same height as the height of the supply side pressure sensor 18, in an actual device, as described using FIG. 1, the supply side damper 16 has different height from the height of the supply side pressure sensor 18. In a similar manner, while, in FIG. 9, the collection side damper 216 has the same height as the height of the collection side pressure sensor 218, in an actual device, the collection side damper 216 has different height from the height of the collection side pressure sensor 218, and whether or not there is abnormality in the collection side pressure sensor 218 is determined by utilizing a hydraulic head pressure generated by a difference between the height at which the collection side damper 216 is provided and the height at which the collection side pressure sensor 218 is provided.

Further, the ink jet device 100 in FIG. 9 includes a filter 70 and an ink temperature controller 72 in the middle of the first channel 36 at the supply side.

The ink temperature controller 72 which is configured to include a heat exchanger and a chiller, can adjust a temperature so as to both heat and cool down ink flowing through the ink channel by adjusting a temperature of water to be flown to the heat exchanger connected to the chiller. The ink temperature controller 72 is controlled by the controller 24.

Air bubbles and dusts are removed from ink accumulated in the ink tank 12 while the ink passes through the filter 70 provided in the middle of a path through which the ink is supplied to the supply side damper 16 by drive force of the supply pump 14, and the temperature of the ink is managed by the ink temperature controller 72.

With such a channel structure, the ink inside the ink tank 12 is supplied to each head module 22 via the first channel 36, the liquid chamber 44 of the supply side damper 16, the second channel 54, the supply side manifold 34, and the supply pipe 32 by driving the supply pump 14. Part of the liquid supplied to the head module 22 is ejected as droplets 113 from a nozzle (not illustrated) of the head module 22.

Ink which is not ejected from the nozzle in ink supplied to the head module 22 passes through an inner channel inside the head module 22 and is returned to the ink tank 12 via the collection pipe 232, the collection side manifold 234, the fourth channel 254, the liquid chamber 244 of the collection side damper 216, and the third channel 236. While, in the present example, the ink tank 12 is also used as a collection tank, a tank for collecting ink may be provided separately from a tank for supplying ink.

By controlling drive of the collection pump 214, it is possible to adjust an ink flow rate at the collection side. Drive of the supply pump 14 and the collection pump 214 is controlled while a pressure is monitored by the supply side pressure sensor 18 and the collection side pressure sensor 218.

When the supply pump 14 and the collection pump 214 are used during normal ink supply (circular supply) such as a case where an image is recorded (printed) using the head bar 120, a pressure Pin of the supply side manifold 34>a pressure Pout of the collection side manifold 234, and both the pressures Pin and Pout are negative pressures. That is, while a supply pressure of the supply pump 14 is a negative pressure, because a collection pressure of the collection pump 214 is a further lower negative pressure, ink flows from the supply side manifold 34 toward the collection side manifold 234, and a back pressure Pnzl of the nozzle of the head module 22 is maintained at a negative pressure. Therefore, the ink circulates toward the nozzle of each head module 22 while meniscus of the ink is maintained at a nozzle portion of the head module 22.

It should be noted that a range of the back pressure Pnzl at which meniscus of the ink can be maintained at the nozzle portion varies according to specification of the head module 22 and a type of ink. In the present embodiment, the back pressure Pnzl is approximately −3000 Pa (G) ("(G)" means a gauge pressure (an atmosphere reference pressure, a relative pressure)).

In the ink jet device 100 in FIG. 9, the ink channel system for collecting ink from each head module 22 to the ink tank 12 corresponds to a "collection path." The ink channel system including the third channel 236, the collection side damper 216, the fourth channel 254, the collection side manifold 234, and the collection pipe 232 in FIG. 9 corresponds to the collection path.

In the case of the circulation type ink jet device 100 as illustrated in FIG. 9, processing of sensing whether or not there is abnormality in the pressure sensors (18 and 218) is performed independently at the supply side and at the collection side.

Specific processing procedure is the same as the method described for a non-circulation type configuration in the first embodiment, and the same processing is implemented respectively at the supply side and at the collection side.

A threshold for abnormality determination can be determined from a total error which takes into account a size of the collection side pressure sensor 218, a size of the collection side damper 216, and a measurement error using the same idea as idea in the case described in the first embodiment.

When whether or not there is abnormality in the collection side pressure sensor 218 is checked, a pressure value is acquired from the collection side pressure sensor 218 in a state where the air chamber 246 of the collection side damper 216 is open to atmosphere, and whether the collection side pressure sensor 218 is normal or abnormal is distinguished from magnitude relation with the threshold by comparing the pressure value with a hydraulic head pressure according to relative height of the collection side pressure sensor 218 with respect to the collection side damper 216.

Whether processing is implemented from the supply side or from the collection side is not particularly limited, and the processing may be implemented from the supply side or from the collection side.

According to the present embodiment, because a pressure at a portion of the pressure sensors (18 and 218) can be measured by utilizing an independent pressure value of the hydraulic head pressure which is determined according to relationship between the height of the dampers for pumps (16 and 216) and the height of the pressure sensors (18 and 218), it is possible to sense abnormality independently at the supply side and at the collection side without separately providing a sensor for calibration.

Example of Overall Configuration of Ink Jet Device

Figure 10:
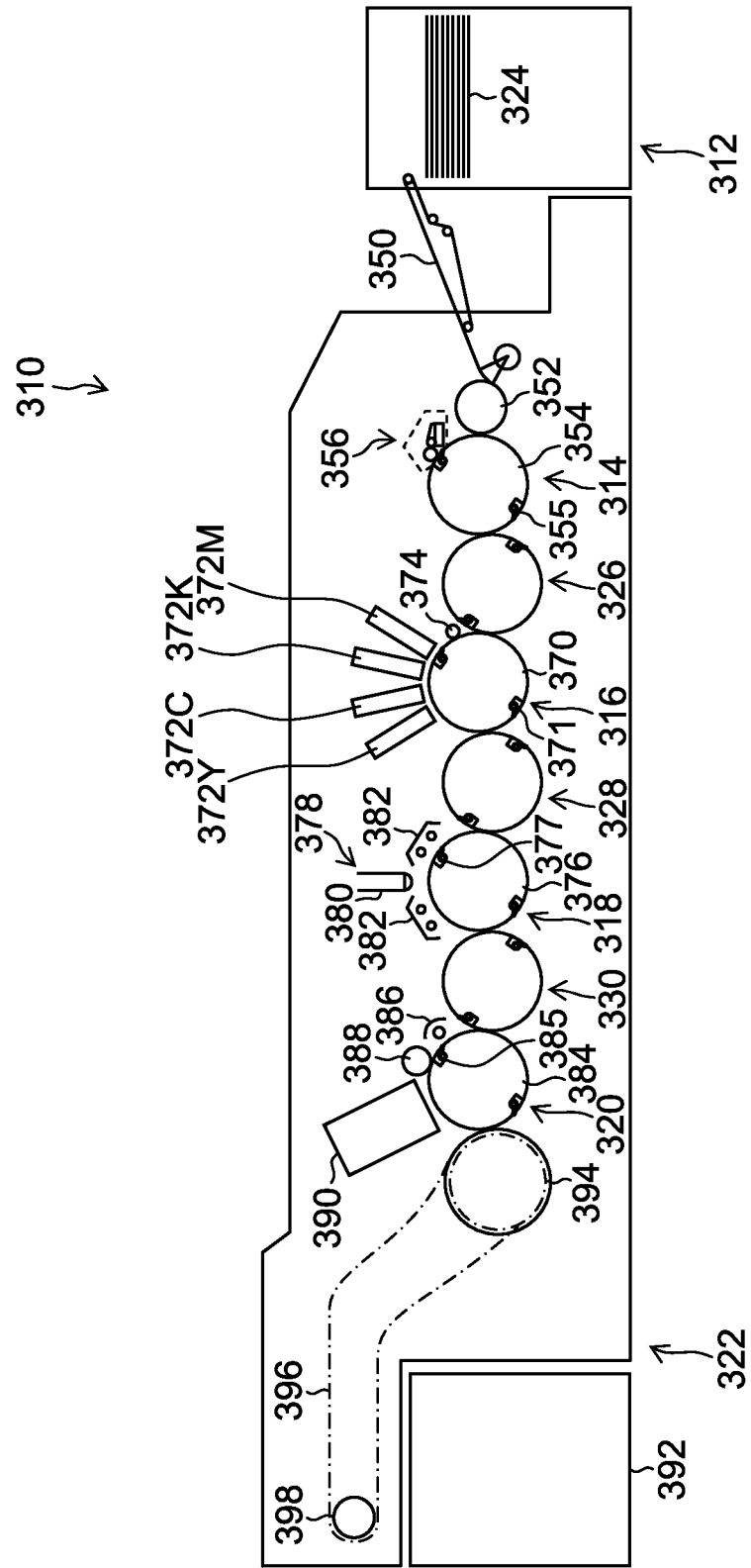
FIG. 10 is a configuration diagram illustrating an overall configuration of the ink jet device.

An example of an overall configuration of the ink jet device will be described next. FIG. 10 is a configuration diagram illustrating the overall configuration of the ink jet device according to the embodiment of the present invention. As illustrated in FIG. 10, an ink jet device 310 of the present embodiment includes a paper feeding unit 312, a processing liquid providing unit 314, a drawing unit 316, a drying unit 318, a fixing unit 320 and a discharging unit 322.

Paper Feeding Unit

The paper feeding unit 212 is a mechanism for supplying a sheet 324 as a recording medium to the processing liquid providing unit 314. At the paper feeding unit 312, sheets 324 which are flat sheets are laminated. At the paper feeding unit 312, a paper feed tray 350 is provided, from which sheets 324 are fed layer by layer to the processing liquid providing unit 314.

While, flat sheets (cut sheets) are used in the present example, it is also possible to employ a configuration in which sheets are cut in a necessary size from a roll sheet and fed.

Processing Liquid Providing Unit

The processing liquid providing unit 314 is a mechanism for providing a processing liquid on a recording face of the sheet 324. The processing liquid contains a color material coagulant which coagulates a color material (in the present example, a pigment) in ink to be provided at the drawing unit 316, and separation of the ink into the color material and a solvent is facilitated by this processing liquid being brought into contact with the ink.

The processing liquid providing unit 314 includes a paper feed drum 352, a processing liquid drum 354 and a processing liquid applying device 356. The processing liquid drum 354 includes claw-like holding means (gripper) 355 at the outer periphery, so that a tip of a sheet 324 can be held by the sheet 324 being put between the claw of the holding means 355 and the periphery of the processing liquid drum 354. A suction hole may be provided at the outer periphery of the processing liquid drum 354, and suction means for performing suction from the suction hole may be connected. By this means, it is possible to tightly hold the sheet 324 at the periphery of the processing liquid drum 354.

The processing liquid applying device 356 is provided outside the processing liquid drum 354 so as to face the periphery of the processing liquid drum 354. The processing liquid applying device 356 includes a processing liquid container in which the processing liquid is accumulated, an onyx roller, part of which is immersed into the processing liquid of the processing liquid container, and a rubber roller which transfers the measured processing liquid to the sheet 324 by being pressed against the sheet 324 on the processing liquid drum 354 and the onyx roller. The sheet 324 to which the processing liquid has been provided at the processing liquid providing unit 314 is passed to a drawing drum 370 of the drawing unit 316 from the processing liquid drum 354 via an intermediate conveying unit 326.

Drawing Unit

The drawing unit 316 includes the drawing drum 370, a sheet pressing roller 374, and ink jet heads 372M, 372K, 372C and 372Y. The drawing drum 370 includes claw-like holding means (gripper) 371 at the outer periphery as in the processing liquid drum 354, and can suction and hold a sheet. The sheet 324 fixed at the drawing drum 370 is conveyed so that a recording face faces outward, and ink is provided on the recording face from the ink jet heads 372M, 372K, 372C and 372Y.

Each of the ink jet heads 372M, 372K, 372C and 372Y is configured with a line head having length corresponding to width of the sheet 324. On an ink ejecting face, a nozzle array in which a plurality of nozzles for ejecting ink are aligned over overall width of an image formation region, is formed. Each of the ink jet heads 372M, 372K, 372C and 372Y is provided so as to extend in a direction orthogonal to a conveyance direction of the sheet 324 (rotation direction of the drawing drum 370).

Droplets of corresponding color ink are respectively ejected from the ink jet heads 372M, 372K, 372C and 372Y toward the recording face of the sheet 324 which is tightly held on the drawing drum 370, thereby the ink contacts the processing liquid provided on the recording face by the processing liquid providing unit 314 in advance, so that a color material (pigment) which is dispersed in the ink is coagulated to form a color material coagulant. By this means, color material flow, or the like, on the sheet 324 is prevented, and an image is formed on the recording face of the sheet 324.

It should be noted that, while, in the present example, a configuration of standard colors (four colors) of CMYK is illustrated, the ink color and combination of color number are not limited to those of the present embodiment, and pale ink, deep ink, and special color ink may be added as necessary. For example, it is also possible to employ a configuration in which ink jet heads which eject light color ink such as light cyan and light magenta are added, and arrangement order of the respective color ink jet heads is not particularly limited.

The sheet 324 on which an image is formed at the drawing unit 316 is passed to a drying drum 376 of the drying unit 318 from the drawing drum 370 via the intermediate conveying unit 328.

Drying Unit

The drying unit 318 is a mechanism for drying moisture contained in the solvent separated through color material coagulation action, and includes the drying drum 376 and a solvent drying device 378.

The drying drum 376 includes claw-like holding means (gripper) 377 at the outer periphery as in the processing liquid drum 354, and can hold a tip of the sheet 324 with the holding means 377.

The solvent drying device 378 includes a plurality of IR heaters (infrared radiation heaters) 382, and hot air blow-off nozzles 380 respectively provided between the respective IR heaters 382. The sheet 324 is held on the outer periphery of the drying drum 376 so that the recording face of the sheet 324 faces outward (that is, in a state where the sheet 324 is curved so that the recording face of the sheet 324 becomes a convex side), and dried while being rotationally conveyed, so that it is possible to prevent occurrence of wrinkles and floating of the sheet 324, and, thus, reliably prevent unevenness in drying caused by the wrinkles and floating.

The sheet 324 which is subjected to drying processing at the drying unit 318 is passed to the fixing drum 384 of the fixing unit 320 via the intermediate conveying unit 330 from the drying drum 376.

Fixing Unit

The fixing unit 320 includes the fixing drum 384, a halogen heater 386, a fixing roller 388 and an inline sensor 390. The fixing drum 384 includes claw-like holding means (gripper) 385 at the outer periphery as in the processing liquid drum 354, and can hold a tip of the sheet 324 with the holding means 385.

By rotation of the fixing drum 384, the sheet 324 is conveyed so that the recording face faces outward, the halogen heater 386 performs preliminary heating, the fixing roller 388 performs fixing processing, and the inline sensor 390 performs examination on the recording face.

It should be noted that in a case where ultraviolet (UV) curable ink is used, means for radiating an ultraviolet light (active light beam), such as a UV lamp and an ultraviolet LD (laser diode) array is provided in place of or in combination with the fixing roller 388 for heating and fixing. After moisture is sufficiently vaporized at the drying unit 318, the ultraviolet light is radiated on the image at the fixing unit provided with the ultraviolet radiating means, thereby a UV curable monomer in the ink is cured and polymerized, so that it is possible to improve image intensity.

Meanwhile, the inline sensor 390 is measuring means for measuring a check pattern, a water amount, a surface temperature, a gloss level, or the like, of the image (including a test chart) recorded on the sheet 324, and a CCD line sensor, or the like, is employed as the inline sensor 390.

Discharging Unit

The discharging unit 322 is provided after the fixing unit 320. The discharging unit 322 includes a discharge tray 392, and a transfer cylinder 394, a conveyance belt 396 and a stretching roller 398 are provided between the discharge tray 392 and the fixing drum 384 of the fixing unit 320 so as to contact the discharge tray 392 and the fixing drum 384. The sheet 324 is conveyed to the conveyance belt 396 by the transfer cylinder 394 and discharged to the discharge tray 392.

Other Configuration

The ink jet device 310 of the present example includes ink supply units which supply ink to the respective ink jet heads 372M, 372K, 372C and 372Y, maintenance processing units which clean the respective ink jet heads 372M, 372K, 372C and 372Y, or the like, in addition to the above-described configuration.

As an ink supply system of each head, the ink supply systems of the first embodiment and the second embodiment described using FIG. 1 to FIG. 9 are applied. Here, an example will be described where the circulation type ink supply system described in the second embodiment (FIG. 9) is applied.

Configuration of Ink Jet Head

Configurations of the ink jet heads 372M, 372K, 372C and 372Y will be described next. Because the configurations of the respective ink jet heads 372M, 372K, 372C and 372Y are the same, a configuration will be described as the configuration of the ink jet head 372. Further, except in a case where the ink jet head 372 is particularly distinguished, the ink jet heads 372M, 372K, 372C and 372Y will be described as the ink jet head 372.

Figure 11:
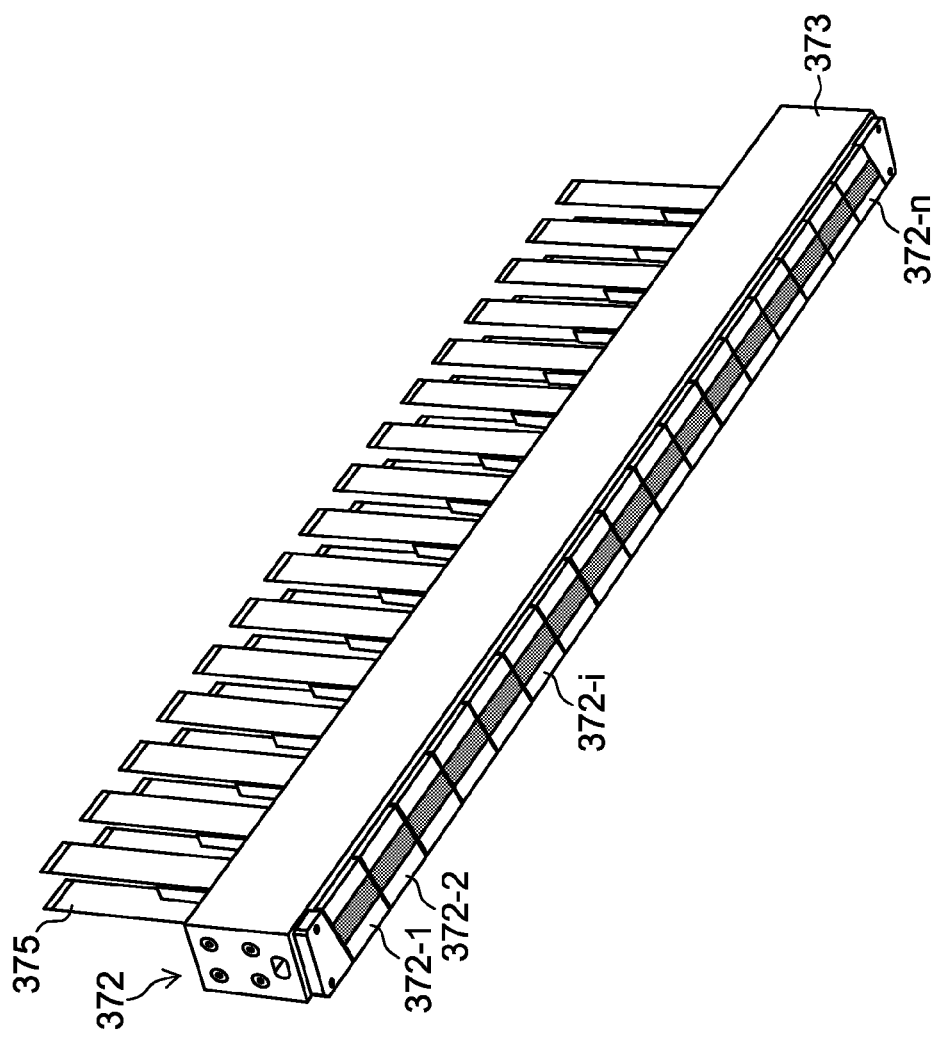
FIG. 11 is a perspective view of an ink jet head.
Figure 12:
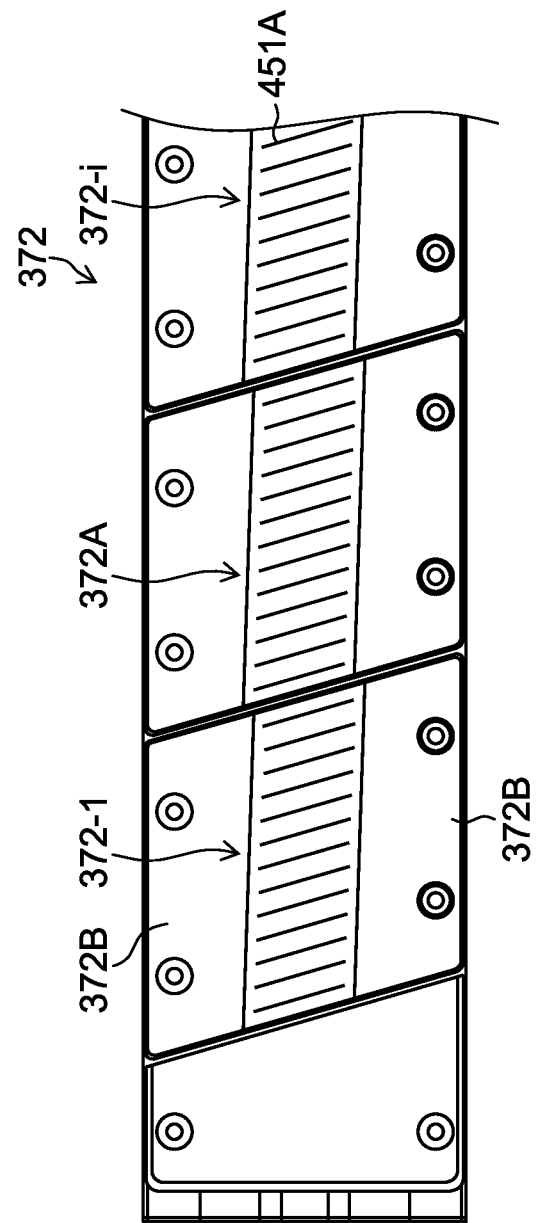
FIG. 12 is a partial enlarged view of the ink jet head seen from a nozzle face side.

FIG. 11 is a perspective view of the ink jet head 372 used in the present embodiment. FIG. 11 illustrates an aspect where a nozzle face (droplet ejecting face) is seen from below (obliquely from below) the head. Further, FIG. 12 is a partial enlarged view of the ink jet head 372 seen from the nozzle face side. As illustrated in the drawings, the ink jet head 372 is configured as a full line type line head bar (page wide head of a single path printing method) which is made longer by coupling a plurality of head modules 372-$i$ (where i=1, 2, ..., n) along a longitudinal direction (sheet width direction orthogonal to a conveyance direction of the sheet 324). "i" designates a module number corresponding to an order that the head module is arranged. The head modules 372-$i$ are the same as reference numbers and reference characters 22-$i$ described using FIG. 1 and FIG. 9.

While FIG. 11 illustrates an example where 17 (n=17) head modules 372-$i$ are coupled, the number and an arrangement form of the head modules configuring the line head bar, and a structure of each head module are not limited to the illustrated example.

Reference numeral 373 in FIG. 11 designates a base frame (housing for configuring a bar-like line head) which becomes a frame body for fixing the plurality of head modules 372-$i$, and reference numeral 375 designates a flexible substrate connected to each head module 372-$i$.

The respective head modules 372-$i$ are integrally attached to the base frame 373 to configure one ink jet head 372. The head modules 372-$i$ are respectively supported by head module supporting members 372B from both sides in a shorter side direction of the ink jet head 372, and are attached to the base frame 373 so as to be able to be freely attached and removed. The respective head modules 372-$i$ can be replaced individually. The head modules 372-$i$ (i=1, 2, ..., n) can respectively function as liquid ejection heads.

As illustrated in FIG. 12, at a nozzle face 372A of each head module 372-$i$ (n-th head module 372-$n$), a plurality of nozzles are arranged in a matrix. In FIG. 12, an oblique solid line assigned reference numeral and reference character 451A designates a nozzle array in which the plurality of nozzles are arranged in line.

Figure 13A:
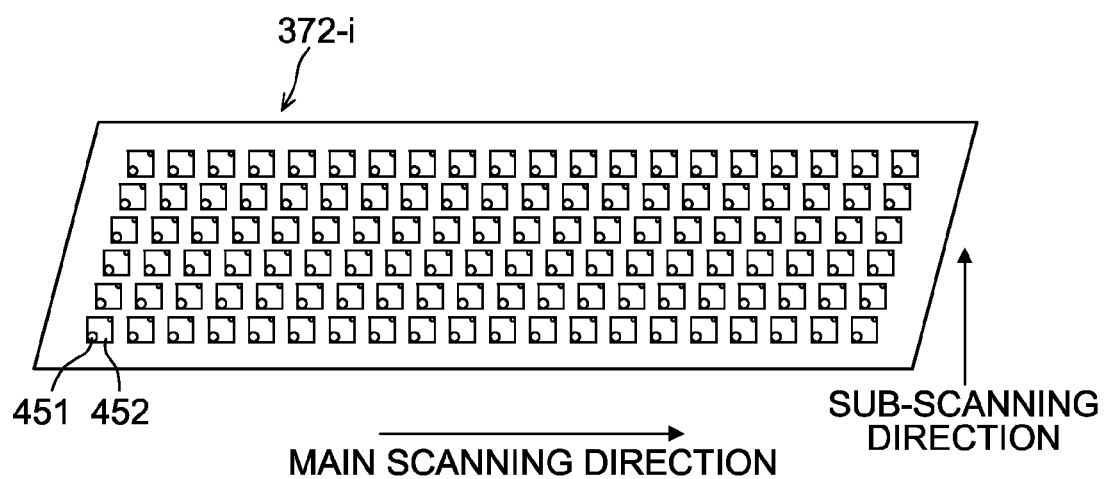
FIG. 13A is a perspective plan view of a head module.
Figure 13B:
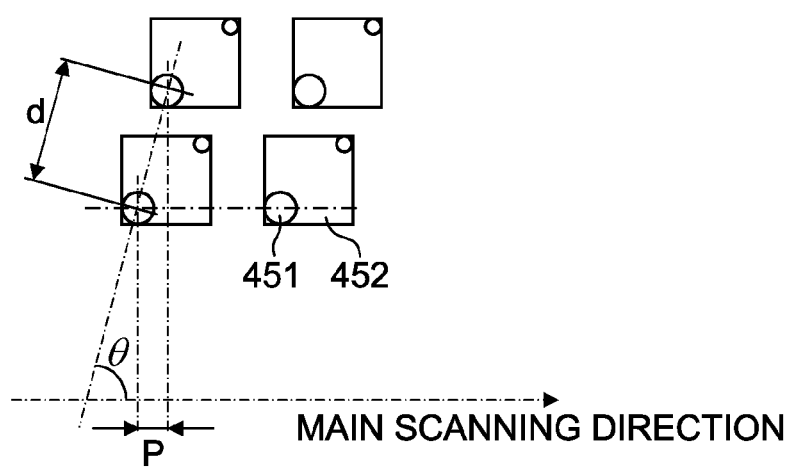
FIG. 13B is an enlarged view of part of the head module illustrated in FIG. 13A.

FIG. 13A is a perspective plan view of the head module. Further, FIG. 13B is an enlarged view of part of the head module illustrated in FIG. 13A. Because the head module 372-$i$ in the present example has a structure in which nozzles 451 which are ink ejection ports are disposed in a matrix (in a two dimensional manner) as illustrated in FIG. 13A and FIG. 13B, a substantial interval of the nozzles (projection nozzle pitch) which are projected so as to be aligned along the longitudinal direction of the ink jet head (direction orthogonal to the conveyance direction of the sheet 324; main scanning direction) is narrowed, so that higher density of the nozzles is realized.

In the examples of FIG. 13A and FIG. 13B, with a configuration in which a plurality of nozzles 451 are arranged along a direction of an angle $\theta$ with respect to the main scanning direction at constant pitch d, pitch P of the nozzles which are projected (orthographically projected) so as to be aligned in the main scanning direction becomes d×cos $\theta$, so that in the main scanning direction, the respective nozzles 451 can be dealt with equivalently to the nozzles linearly arranged at constant pitch P.

It should be noted that an arrangement structure of the nozzles is not limited to the illustrated example, and various nozzle arrangement structures such as an arrangement structure where a nozzle array is provided in line in a sub-scanning direction can be applied.

By coupling such a plurality of head modules 372-i in the sheet width direction (main scanning direction), a nozzle array which covers the whole drawing range for the sheet width is formed, and a full line type head which is capable of recording an image at predetermined recording resolution (for example, 1200 dpi) with one drawing and scanning (single path printing method) is configured.

Figure 14:
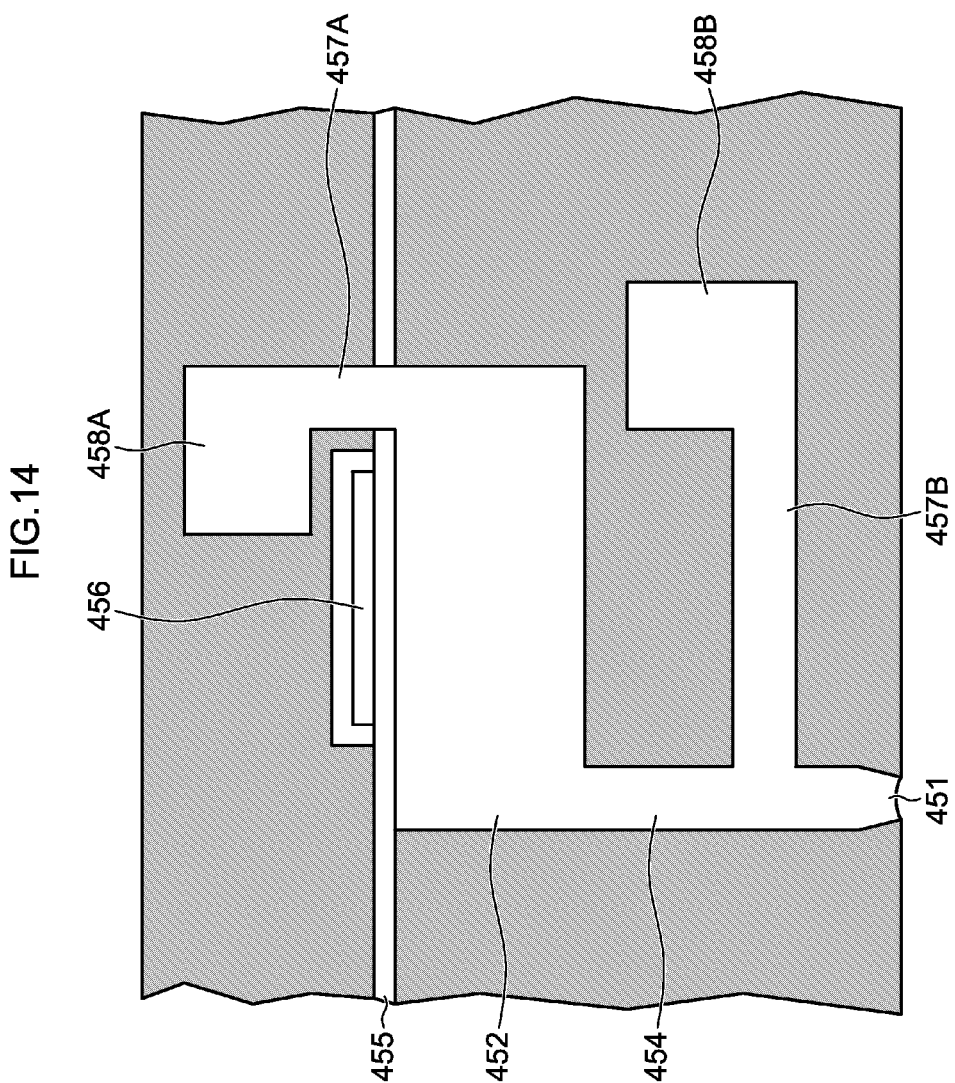
FIG. 14 is a longitudinal sectional view illustrating an inner structure of the head module.

FIG. 14 is a longitudinal sectional view illustrating an inner structure of the head module. As illustrated in FIG. 14, a pressure chamber 452 is formed as cuboid space, and a nozzle channel 454 is in communication with one corner of a bottom of the pressure chamber 452. The nozzle channel 454 extends vertically downward from the pressure chamber 452 and is in communication with a nozzle 451.

A wall surface of a ceiling of the pressure chamber 452 is formed with a vibration plate 455 so as to allow flexural deformation along the vertical direction. A piezoelectric element 456 is attached on the vibration plate 455, and the vibration plate 455 is vertically deformed by the piezoelectric element 456. When the vibration plate 455 deforms along the vertical direction, a volume of the pressure chamber 452 expands or shrinks, and ink is ejected from the nozzle 451.

It should be noted that the piezoelectric element 456 has a laminated structure in which a piezoelectric body intervenes between electrodes, and is driven by applying a predetermined drive voltage between an individual electrode which is provided at an upper part of the laminated structure and which is not illustrated and the vibration plate 455 which acts as a common electrode, thereby the vibration plate 455 vertically deforms.

An individual supply channel 457A for supplying ink to the pressure chamber 452 is in communication with one corner of the wall surface of the ceiling of the pressure chamber 452. The individual supply channel 457A is in communication with a common supply channel 458A.

The common supply channel 458A is provided in a unit of an array of the nozzles 451 which are arranged so as to be inclined at a predetermined angle with respect to the conveyance direction of the sheet 324. To the pressure chamber 452 of the nozzle 451 of each array, ink is supplied from the common supply channel 458A through the individual supply channel 457A.

The common supply channel 458A of each array is in communication with an ink supply channel (supply path) which is not illustrated, and the ink supply channel is in communication with an ink supply port which is not illustrated. As described using FIG. 9, ink from the ink tank 12 is supplied to the ink supply port. The ink supplied to the ink supply port is supplied to the common supply channel 458A of each array through the ink supply channel, and further supplied to each pressure chamber 452 through the individual supply channel 457A.

One end of an individual collection channel 457B is in communication with the nozzle channel 454. The individual collection channel 457B is in communication with the nozzle channel 454 near the nozzle 451. The other end of the individual collection channel 457B is in communication with the common collection channel 458B.

The common collection channel 458B is provided in a unit of an array of the nozzles 451 which are arranged to be inclined at a predetermined angle with respect to the conveyance direction of the sheet 324 in a similar manner to the common supply channel 458A. The common collection channel 458B of each array is in communication with an ink collection channel (collection path) which is not illustrated. The ink collection channel is in communication with an ink collection port which is not illustrated.

Part of ink flowing through each nozzle channel 454 flows through the individual collection channel 457B and is collected at the common collection channel 458B. The ink is then collected from each common collection channel 458B to the ink tank 12 through the ink collection channel and the ink collection port (see FIG. 9). That is, at the ink jet head in the present embodiment, ink circulates and is supplied to each head module 372-i.

The ink circulation and supply system is as described using FIG. 9.

When ink is ejected from the ink jet head 372 to perform drawing, ink supplied to the supply side manifold 34 is supplied to each head module 372-i at a pressure Pin determined in advance and at a flow rate determined in advance, and ink supplied to the head module 372-i is respectively collected from the head module 372-i to the collection side manifold 234 at a pressure Pout determined in advance and at a flow rate determined in advance.

By the pressure Pin of the supply side manifold 34 and the pressure Pout of the collection side manifold 234, a differential pressure ΔP is generated at the head module 372-i, and, as a result, an ink flow occurs inside the head module 372-i, which allows fresh ink to be always supplied to the head module 372-i. A back pressure Pnzl which depends on the pressure Pin of the supply side manifold 34 and the pressure Pout of the collection side manifold 234 is provided to the nozzle which is an ink ejection port (ejection port).

Control System of Ink Jet Device

Figure 15:
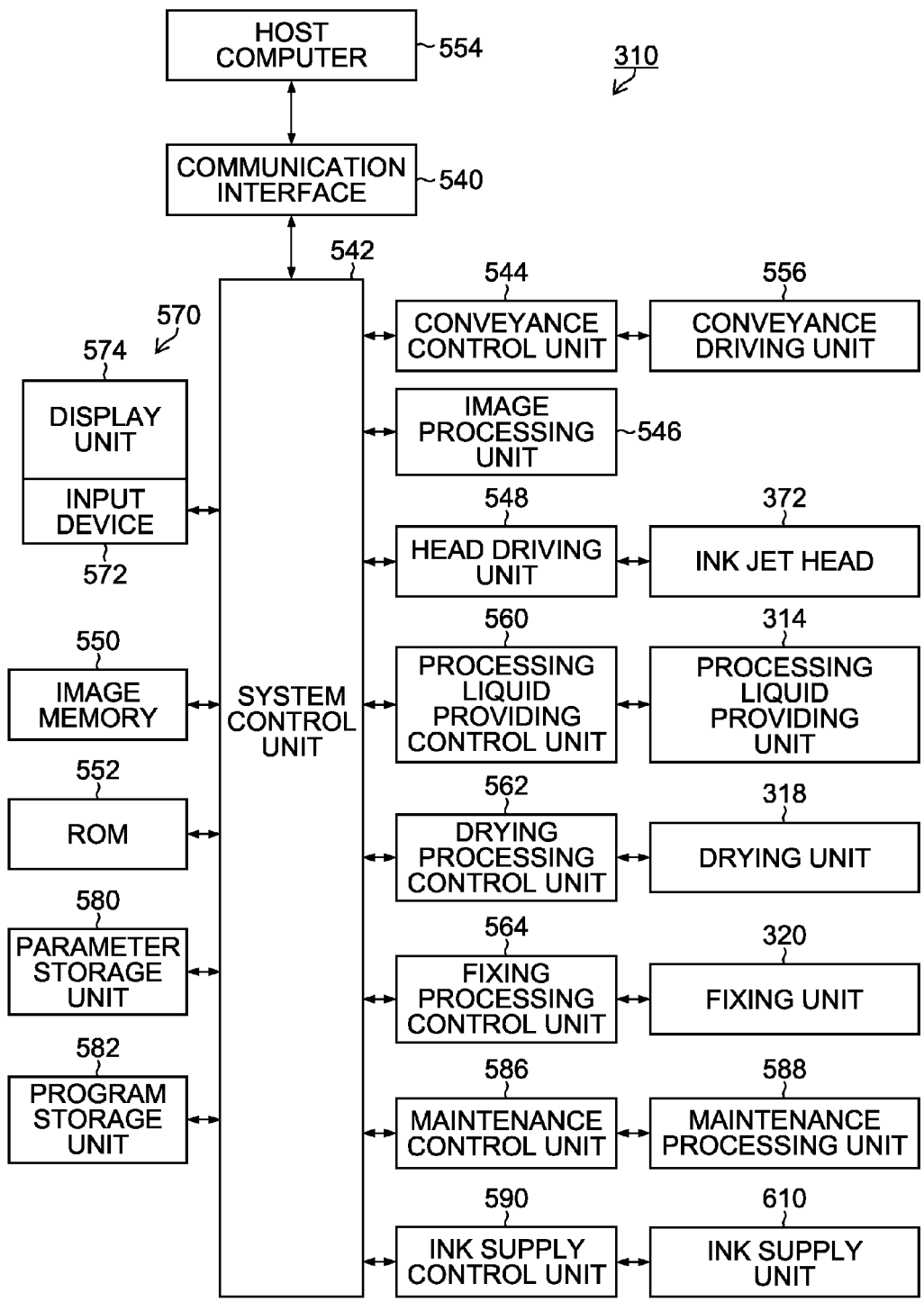
FIG. 15 is a block diagram illustrating a schematic configuration of a control system of the ink jet device.

A configuration of an overall control system of the ink jet device 310 will be described next. FIG. 15 is a block diagram illustrating a schematic configuration of a control system of an ink jet device 310. The ink jet device 310 includes a communication interface 540, a system control unit 542, a conveyance control unit 544, an image processing unit 546, and an ink jet head driving unit 548, and further includes an image memory 550 and a ROM (read only memory) 552.

The communication interface 540 is an interface unit which receives image data transmitted from a host computer 554. As the communication interface 540, a serial interface such as a USB (universal serial bus) may be applied, or a parallel interface such as centronics may be applied. A buffer memory (not illustrated) for realizing faster communication may be mounted on the communication interface 540.

The system control unit 542 includes a central processing unit (CPU), peripheral circuits of the CPU, and functions as control means for controlling the whole of the ink jet device 310 according to a predetermined program, and also functions as an arithmetic device which performs various operation. The system control unit 542 also functions as a memory controller of the image memory 550 and the ROM 552. That is, the system control unit 542 controls the respective components such as the communication interface 540 and the conveyance control unit 544, controls communication with the host computer 554, controls reading and writing of the image memory 550 and the ROM 552, and generates a control signal for controlling the above-described respective components.

The image data sent out from the host computer 554 is taken into the ink jet device 310 via the communication interface 540 and subjected to predetermined image processing by the image processing unit 546.

The image processing unit 546 has a signal (image) processing function of performing processing such as various processing and correction for generating a signal for printing control from the image data, and supplies the generated printing data to the ink jet head driving unit 548. Required signal processing is performed at the image processing unit 546, and an ejected droplet amount (droplet ejection amount) and an ejection timing of the ink jet head 372 are controlled through the ink jet head driving unit 548 based on the image data. By this means, a desired dot size and dot arrangement are realized.

It should be noted the ink jet head driving unit 548 may include a feedback control system for maintaining fixed drive conditions of the ink jet head 372.

The ink jet head driving unit 548 include a drive waveform generating unit which generates a drive waveform, an amplifying unit which amplifies the drive waveform to generate a drive voltage, and a drive voltage supplying unit which supplies the drive voltage having a predetermined drive waveform to the ink jet head. A drive waveform is generated (or a corresponding drive waveform is selected from drive waveforms stored in advance) based on image data (digital data) transmitted from the system control unit, and a drive voltage having the drive waveform is generated.

The conveyance control unit 544 controls a conveyance timing and conveyance speed of the sheet 324 based on a signal for printing control generated by the image processing unit 546. The conveyance driving unit 556 includes a motor for rotating a conveyance drum of each component, a motor for rotating an intermediate carrier, or the like, and the conveyance control unit 544 functions as a driver of the above-described motors.

The image memory 550 has a function as primary storage means for storing the image data input via the communication interface 540 once, and a function as an area where various programs stored in the ROM 552 are expanded and an operation work area of the CPU (for example, a work area of the image processing unit 546). As the image memory 550, a volatile memory (RAM) which allows sequential reading and writing is used.

In the ROM 552, programs executed by the CPU of the system control unit 542, various data and control parameters necessary for controlling each component of the device, or the like, are stored, and data is read out and written through the system control unit 542. The ROM 552 is not limited to a memory comprised of a semiconductor device, and a magnetic medium such as a hard disc may be used as the ROM 552. It is also possible to provide an external interface and use a detachable storage medium.

Further, the ink jet device 310 includes a processing liquid providing control unit 560, a drying processing control unit 562, a fixing processing control unit 564, a maintenance control unit 586, an ink supply control unit 590, and controls operation of each component of the processing liquid providing unit 314, the drying unit 318, the fixing unit 320, the maintenance processing unit 588, and the ink supply unit 610 according to an instruction from the system control unit 542.

The processing liquid providing control unit 560 controls a timing for providing a processing liquid by the processing liquid providing unit 314 based on the printing data obtained from the image processing unit 546 and controls a providing amount of the processing liquid.

The drying processing control unit 562 controls a solvent drying device 378 included in the drying unit 318 and controls a processing temperature, a blast volume, or the like.

The fixing processing control unit 564 controls a temperature of the halogen heater 386 included in the fixing unit 320 and controls a pressure by the fixing roller 388.

The ink jet device 310 described in the present example includes a user interface 570. The user interface 570 include an input device 572 for allowing an operator (user) to perform various input, and a display unit (display) 574. As the input device 572, various forms such as a keyboard, a mouse, a touch panel, and a button can be employed. The operator can input printing conditions, select an image quality mode, input and edit related information, search for information, or the like, by operating the input device 572 and can confirm various information such as an entry and a search result through display of the display unit 574. The display unit 574 also functions as means for displaying an alarm such as an error message. The display unit 574 corresponds to the display unit 26 in FIG. 9.

The parameter storage unit 580 stores various control parameters necessary for operation of the ink jet device 310. The system control unit 542 reads out a parameter necessary for control as appropriate and updates (rewrites) various parameters as necessary.

The program storage unit 582 is storage means for storing control programs for operating the ink jet device 310. The system control unit 542 reads out a necessary control program from the program storage unit 582 when executing control of each component of the device and executes the control program as appropriate.

It should be noted that the parameter storage unit 580 can be also used as the program storage unit 582, or the program storage unit 582 can be also used as the parameter storage unit 580.

The maintenance control unit 586 is a control block for controlling operation of the maintenance processing unit 588 based on an instruction signal transmitted from the system control unit 542. When control of the ink jet device 310 shifts to a maintenance mode, the ink jet head 372 is moved from a printing position right above the drawing drum 370 to a maintenance position, while each component of the maintenance processing unit 588 is made to operate in accordance with movement of the ink jet head 372.

The ink supply control unit 590 controls operation of the ink supply unit 610 based on the instruction signal transmitted from the system control unit 542.

As described in FIG. 9, the ink jet device 310 in the present embodiment supplies ink to the ink jet head 372 in a circulated manner. The function of the ink supply control unit 590 can be integrated with the function of the system control unit 542. The ink supply control unit 590, or the system control unit 542, or combination of these corresponds to the controller 24 in FIG. 9, and corresponds to the "control unit."

Modified Example 1 of Embodiment

While a case has been described in the above-described embodiments, where when abnormality of the pressure sensor is sensed, an alarm is displayed, when the pressure sensor is continuously used after abnormality is sensed because the pressure sensor cannot be replaced for some reason, it is also possible to employ an aspect where a difference between a current sensor output value recognized by applying the above-described abnormality sensing processing, and an original output value (value of a normal value) is calculated, and correction processing for calibrating the output value using the difference is performed. When a failure mode of the pressure sensor is recognized in advance (for example, when it is recognized that abnormality that a value is offset by a constant being added to the normal value occurs), a correction amount (offset amount) can be obtained from a difference between the sensor output value in a state where the air chamber is open to atmosphere and the normal value.

Modified Example 2

A form of the long ink jet head configured with a plurality of head modules is not limited to the forms illustrated in FIG. 11 and FIG. 12. For example, the present invention can be also applied to an ink jet head having a structure where a plurality of head modules are arranged zigzag.

Modified Example 3

While, in the above-described embodiments, the ink jet recording device in which an image is formed by an ink droplet being directly deposited on a sheet (direct recording method) has been described, an application range of the present invention is not limited to this, and the present invention can be also applied to an intermediate transfer type ink jet recording device in which an image (primary image) is formed on an intermediate transfer body once, the image is transferred to a recording sheet at a transferring unit, so that a final image is formed.

Ejection Method

Means for generating a pressure for ejection (ejection energy) for letting a droplet to be ejected from each nozzle at the ink jet head is not limited to a piezo actuator (piezoelectric element), and various pressure generation elements (ejection energy generation elements) such as a thermal heater (heating element) (in which ink is ejected by utilizing a pressure of film boiling as a result of heating of the heater) and various actuators using other methods can be applied. A corresponding energy generation element is provided at a channel structure according to an ejection type of the head.

Other Application Examples

While in the above-described embodiments, an example where the present invention is applied to the ink jet device for graphic printing has been described as one form of the liquid discharge device, the application range of the present invention is not limited to this example. For example, the present invention can be widely applied to a liquid discharge device including a liquid ejection head which draws various shapes and patterns using a liquid functional material, such as a wiring drawing device which draws a wiring pattern of an electronic circuit, a manufacturing device of various devices, a resist printing device which uses a resin liquid as a functional liquid for ejection, a color filter manufacturing device, and a fine structure forming device which forms a fine structure using a material for material deposition.

Components of the above-described embodiments of the present invention can be changed, added, or deleted as appropriate without departing from the scope of the present invention. The present invention is not limited to the above-described embodiments, and various modifications are possible by a person who has ordinary skill in the field within the technical scope of the present invention.

What is claimed is:

1. An abnormality sensing method of a pressure sensor of a liquid discharge device comprising:
    a liquid ejection head;
    a liquid accumulating unit in which a liquid to be supplied to the liquid ejection head is accumulated;
    a supply path that guides the liquid accumulated in the liquid accumulating unit to the liquid ejection head;
    a supply pump that feeds the liquid to the liquid ejection head from the liquid accumulating unit through the supply path;
    a damper that is provided on the supply path and that has a liquid chamber and an air chamber sectioned via a flexible membrane; and
    a pressure sensor,
    the abnormality sensing method comprising: an atmosphere opening step of opening the air chamber to atmosphere;
    a pressure value acquiring step of acquiring a pressure value from the pressure sensor in a state where the air chamber is open to atmosphere; and
    an abnormality determining step of determining whether or not there is abnormality in the pressure sensor based on comparison between a hydraulic head pressure between the damper and the pressure sensor, and the pressure value.

2. The abnormality sensing method of the pressure sensor according to claim 1, comprising a membrane position adjusting step of adjusting a position of the flexible membrane to a position in a non-elastic deformation region where elastic force of the flexible membrane can be ignored prior to the pressure value acquiring step.

3. The abnormality sensing method of the pressure sensor according to claim 2, wherein the membrane position adjusting step comprising:
    a pressurizing step of bringing the flexible membrane into contact with an inner wall of the damper by driving the supply pump in a pressurization direction to increase a pressure inside the damper; and
    a depressurizing step of, after the flexible membrane is brought into contact with the inner wall of the damper, driving the supply pump in a depressurization direction to extract a designated amount of a liquid from the liquid chamber.

4. The abnormality sensing method of the pressure sensor according to claim 1, wherein
    a threshold is determined based on an allowable error when the pressure value is acquired, and
    when a difference between the pressure value and the hydraulic head pressure determined from relative height of the pressure sensor with respect to the damper exceeds the threshold, it is determined that the pressure sensor is abnormal.

5. The abnormality sensing method of the pressure sensor according to claim 4, wherein
    where the pressure value is P_exp, a unit of P_exp is pascals, relative height of the pressure sensor with respect to a position of the damper is H, a unit of H is meters, density of the liquid is $\rho$, a unit of $\rho$ is kg/m$^3$, gravitational acceleration is g, and a unit of g is m/s$^2$,
    whether or not there is the abnormality is determined by comparing an absolute value |P_exp−$\rho$gH| of a difference between the value of the hydraulic head pressure determined by $\rho$gH and the pressure value P_exp with the threshold.

6. The abnormality sensing method of the pressure sensor according to claim 1, wherein
where a hydraulic head error due to a size of the pressure sensor is $\Delta P\_sys\_sensor$,
a hydraulic head error due to a size of the damper is $\Delta P\_sys\_damper$, and
a measurement error of the pressure sensor is $\Delta P\_measured$,
a total error $\Delta P\_total$ can be obtained from $\Delta P\_total = \{(\Delta P\_sys\_sensor)^2 + (\Delta P\_sys\_damper)^2 + (\Delta P\_measured)^2\}^{1/2}$, a unit of $\Delta P\_total$ is pascals, and
the threshold for determination is determined based on the value of the total error $\Delta P\_total$.

7. The abnormality sensing method of the pressure sensor according to claim 1, the liquid discharge device comprising:
a collection path for collecting a liquid from the liquid ejection head;
a collection pump that is provided on the collection path;
a collection side damper that is provided on the collection path and that has a liquid chamber and an air chamber sectioned via a flexible membrane; and
a collection side pressure sensor that is provided on the collection path,
the abnormality sensing method comprising:
an atmosphere opening step of opening the air chamber of the collection side damper to atmosphere;
a pressure value acquiring step of acquiring a pressure value from the collection side pressure sensor in a state where the air chamber of the collection side damper is open to atmosphere; and
an abnormality determining step of determining whether or not there is abnormality in the collection side pressure sensor based on comparison between a hydraulic head pressure between the collection side damper and the collection side pressure sensor, and the pressure value acquired from the collection side pressure sensor.

8. A liquid discharge device comprising:
a liquid ejection head;
a liquid accumulating unit in which a liquid to be supplied to the liquid ejection head is accumulated;
a supply path that guides the liquid accumulated in the liquid accumulating unit to the liquid ejection head;
a supply pump that feeds the liquid from the liquid accumulating unit to the liquid ejection head through the supply path;
a damper that is provided on the supply path and that has a liquid chamber and an air chamber sectioned via a flexible membrane;
a pressure sensor; and
an abnormality sensing processing unit that acquires a pressure value from the pressure sensor in a state where the air chamber is open to atmosphere, and determines whether or not there is abnormality in the pressure sensor based on comparison between a hydraulic head pressure between the damper and the pressure sensor, and the pressure value.

9. The liquid discharge device according to claim 8, comprising a control unit that controls the supply pump based on information from the pressure sensor,
wherein the control unit functions as the abnormality sensing processing unit.

10. The liquid discharge device according to claim 9, wherein the control unit performs control of adjusting a position of the flexible membrane to a position in a non-elastic deformation region where elastic force of the flexible membrane can be ignored before the pressure value is acquired in a state where the air chamber is open to atmosphere.

11. The liquid discharge device according to claim 8, further comprising:
a collection path for collecting a liquid from the liquid ejection head;
a collection pump that is provided on the collection path;
a collection side damper that is provided on the collection path and that has a liquid chamber and an air chamber sectioned via a flexible membrane; and
a collection side pressure sensor that is provided on the collection path,
wherein the abnormality sensing processing unit acquires a pressure value from the collection side pressure sensor in a state where the air chamber of the collection side damper is open to atmosphere, and determines whether or not there is abnormality in the collection side pressure sensor based on comparison between a hydraulic head pressure between the collection side damper and the collection side pressure sensor, and the pressure value acquired from the collection side pressure sensor.

* * * * *